US012776330B2

(12) United States Patent
Doehla et al.

(10) Patent No.: US 12,776,330 B2
(45) **Date of Patent: *Oct. 27, 2026**

(54) LOW-FREQUENCY EMPHASIS FOR LPC-BASED CODING IN FREQUENCY DOMAIN

(71) Applicant: Fraunhofer-Gesellschaft zur Foerderung der angewandten Forschung e.V., Munich (DE)

(72) Inventors: Stefan Doehla, Erlangen (DE); Bernhard Grill, Lauf (DE); Christian Helmrich, Erlangen (DE); Nikolaus Rettelbach, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 411 days.

This patent is subject to a terminal disclaimer.

(21) Appl. No.: 18/529,840

(22) Filed: Dec. 5, 2023

(65) Prior Publication Data

US 2024/0119953 A1 Apr. 11, 2024

Related U.S. Application Data

(63) Continuation of application No. 17/992,496, filed on Nov. 22, 2022, now Pat. No. 11,854,561, which is a (Continued)

(51) Int. Cl.
*G10L 19/087* (2013.01)
*G10L 19/02* (2013.01)

(Continued)

(52) U.S. Cl.
CPC ............ *G10L 19/087* (2013.01); *G10L 19/06* (2013.01); *G10L 19/16* (2013.01); *G10L 19/26* (2013.01);

(Continued)

(58) Field of Classification Search
CPC ..... G10L 19/0212; G10L 19/06; G10L 19/08; G10L 19/087; G10L 19/16; G10L 19/26; G10L 19/265
See application file for complete search history.

(56) References Cited

U.S. PATENT DOCUMENTS 4,139,732 A 2/1979 Fourcin
4,890,327 A 12/1989 Bertrand et al.

(Continued)

FOREIGN PATENT DOCUMENTS

CN 1166669 A 12/1997
CN 1275228 A 11/2000

(Continued)

OTHER PUBLICATIONS

“”ITU-T G.723.1.

(Continued)

*Primary Examiner* — Eric Yen
(74) *Attorney, Agent, or Firm* — Perkins Coie LLP; Michael A. Glenn

(57) ABSTRACT

The invention provides an audio encoder including a combination of a linear predictive coding filter having a plurality of linear predictive coding coefficients and a time-frequency converter, wherein the combination is configured to filter and to convert a frame of the audio signal into a frequency domain in order to output a spectrum based on the frame and on the linear predictive coding coefficients; a low frequency emphasizer configured to calculate a processed spectrum based on the spectrum, wherein spectral lines of the processed spectrum representing a lower frequency than a reference spectral line are emphasized; and a control device configured to control the calculation of the processed spec- (Continued)

trum by the low frequency emphasizer depending on the linear predictive coding coefficients of the linear predictive coding filter.

28 Claims, 8 Drawing Sheets

Related U.S. Application Data continuation of application No. 16/899,328, filed on Jun. 11, 2020, now Pat. No. 11,568,883, which is a continuation of application No. 15/956,591, filed on Apr. 18, 2018, now Pat. No. 10,692,513, which is a continuation of application No. 14/811,716, filed on Jul. 28, 2015, now Pat. No. 10,176,817, which is a continuation of application No. PCT/EP2014/051585, filed on Jan. 28, 2014.

(60) Provisional application No. 61/758,103, filed on Jan. 29, 2013.

(51) Int. Cl.
*G10L 19/06* (2013.01)
*G10L 19/08* (2013.01)
*G10L 19/16* (2013.01)
*G10L 19/26* (2013.01)

(52) U.S. Cl.
CPC ........ *G10L 19/265* (2013.01); *G10L 19/0212* (2013.01); *G10L 19/08* (2013.01)

(56) References Cited

U.S. PATENT DOCUMENTS 4,903,303 A 2/1990 Taguchi
5,173,941 A 12/1992 Yip et al.
5,473,727 A * 12/1995 Nishiguchi ........... G10L 19/005 704/226
5,548,647 A 8/1996 Naik et al.
5,651,090 A 7/1997 Moriya et al.
5,657,422 A 8/1997 Janiszewski et al.
5,774,846 A 6/1998 Morii
5,864,796 A * 1/1999 Inoue ...................... G10L 19/07 704/265
5,890,108 A 3/1999 Yeldener
5,926,785 A 7/1999 Akamine et al.
6,064,962 A 5/2000 Oshikiri et al.
6,278,972 B1 8/2001 Bi et al.
6,506,968 B1 1/2003 Kurihara
6,526,376 B1 2/2003 Villette et al.
6,748,363 B1 * 6/2004 Lueck ................... G10L 19/022 704/229
6,754,618 B1 6/2004 Konstantinides et al.
6,782,361 B1 8/2004 El-Maleh et al.
6,898,566 B1 * 5/2005 Benyassine ............. G10L 19/22 704/226
6,975,254 B1 12/2005 Sperschneider et al.
7,873,064 B1 1/2011 Li et al.
7,933,769 B2 4/2011 Bessette
8,560,329 B2 10/2013 Zhang et al.
9,280,982 B1 3/2016 Kushner
9,449,606 B2 9/2016 Rettelbach et al.
10,176,817 B2 1/2019 Doehla et al.
2002/0103637 A1 8/2002 Henn et al.
2004/0054519 A1 3/2004 Kobayashi et al.
2004/0153313 A1 8/2004 Aubauer et al.
2004/0193407 A1 9/2004 Ramabadran et al.
2004/0243397 A1 12/2004 Averty et al.
2005/0010397 A1 1/2005 Sakurai et al.
2005/0071027 A1 3/2005 Prakash et al.
2005/0187762 A1 8/2005 Tanaka et al.
2005/0261896 A1 11/2005 Schuijers et al.
2006/0015332 A1 1/2006 Chen et al.
2006/0095253 A1 5/2006 Schuller et al.
2006/0271373 A1 11/2006 Khalil et al.
2006/0277040 A1 12/2006 Sung et al.
2007/0011002 A1 * 1/2007 Chinen ................... H04L 27/00 704/229
2007/0147518 A1 * 6/2007 Bessette .............. G10L 19/0212 375/243
2007/0206645 A1 9/2007 Sundqvist et al.
2007/0225971 A1 9/2007 Bessette
2007/0239462 A1 10/2007 Makinen et al.
2007/0260454 A1 11/2007 Gemello et al.
2007/0282603 A1 12/2007 Bessette
2008/0049795 A1 2/2008 Lakaniemi
2008/0059166 A1 * 3/2008 Ehara .................... G10L 19/265 704/E19.044
2008/0147414 A1 6/2008 Son et al.
2008/0294429 A1 11/2008 Su et al.
2009/0018824 A1 1/2009 Teo
2009/0164225 A1 6/2009 Cho
2009/0240491 A1 9/2009 Reznik
2009/0326930 A1 12/2009 Kawashima et al.
2010/0023575 A1 * 1/2010 Choo ...................... G10L 19/04 708/607
2010/0049511 A1 2/2010 Ma et al.
2010/0286990 A1 * 11/2010 Biswas ................. G10L 19/008 704/502
2011/0173004 A1 7/2011 Bessette et al.
2011/0173008 A1 7/2011 Lecomte et al.
2011/0178795 A1 7/2011 Bayer et al.
2011/0196673 A1 8/2011 Sharma et al.
2012/0209604 A1 8/2012 Sehlstedt
2012/0245947 A1 9/2012 Neuendorf et al.
2013/0144632 A1 6/2013 Sung
2013/0182862 A1 7/2013 Disch
2013/0185078 A1 7/2013 Tzirkel-Hancock et al.
2013/0226597 A1 8/2013 Kjoefling et al.
2013/0332177 A1 12/2013 Helmrich et al.
2013/0339012 A1 12/2013 Kawashima et al.
2014/0074486 A1 3/2014 Disch et al.
2014/0188465 A1 7/2014 Choo et al.
2014/0358529 A1 12/2014 Wu

FOREIGN PATENT DOCUMENTS

CN 101023471 A 8/2007
CN 101364854 B 1/2011
CN 1957398 B 9/2011
CN 102648494 A 8/2012
CN 105122357 B 4/2019
EP 0424016 A2 4/1991
EP 965123 B1 1/2003
EP 0985328 B1 3/2006
EP 1850327 A1 10/2007
EP 1088302 B1 7/2008
EP 2107556 A1 10/2009
EP 2214164 A2 8/2010
EP 2951814 B1 5/2017
FR 2830970 A1 4/2003
JP 086596 A 1/1996
JP 2001117573 A 4/2001
JP 2007525707 A 9/2007
JP 2011527459 A 10/2011
RU 2389085 C2 5/2010
RU 2414009 C2 3/2011
RU 2456682 C2 7/2012
WO 9847313 A2 10/1998
WO 2005078706 A1 8/2005
WO 2008100503 A2 8/2008
WO 2010003663 A1 1/2010
WO 2011042464 A1 4/2011
WO 2011044700 A1 4/2011
WO 2011048094 A1 4/2011
WO 2011048117 A1 4/2011

(56) References Cited

FOREIGN PATENT DOCUMENTS

| | | | |
|---|---|---|---|
| WO | 2012110415 | A1 | 8/2012 |
| WO | 2014096279 | A1 | 6/2014 |

OTHER PUBLICATIONS

“”Schnell et al., Proposed Core Experiment on AAC-ELD, Apr. 18, 2007.
“”3GPP TS 26.445 V14.0.0, 3rd Generation Partnership Project, Technical Specification Group Services and System Aspects, Codec for Enhanced Voice Services (EVS), Detailed Algorithmic Description, (Release 14), Mar. 2017.
“”3GPP TS 26.442 V14.0.0, 3rd Generation Partnership Project, Technical Specification Group Services and System Aspects, Codec for Enhanced Voice Services (EVS), ANSI C code (fixed-point), (Release 14), Mar. 2017.
“”3GPP TS 26.443 V14.0.0, 3rd Generation Partnership Project, Technical Specification Group Services and System Aspects, Codec for Enhanced Voice Services (EVS), ANSI C code (floating-point), (Release 14), Mar. 2017.
“”3GPP TR 26.952 V17.0.0, 3rd Generation Partnership Project, Technical Specification Group Services and System Aspects, Codec for Enhanced Voice Services (EVS), Performance Characterization, (Release 17), Apr. 2022.
“”3GPP TS 26.403 V6.0.0, 3rd Generation Partnership Project, Technical Specification Group Services and System Aspects, General audio codec audio processing functions, Enhanced aacPlus general audio codec, Encoder specification AAC part, (Release 6), Sep. 2004.
“”ITU-T G.718, Series G: Transmission Systems and Media, Digital Systems and Networks, Digital terminal equipments—Coding of voice and audio signals, Jun. 2008.
“”3GPP TS 26.445 V12.0.0, 3rd Generation Partnership Project, Technical Specification Group Services and System Aspects, Codec for Enhanced Voice Services (EVS), Detailed Algorithmic Description, (Release 12), Sep. 2014.
“”3GPP TS 26.445 V14.2.0 (Dec. 2017)—3rd Generation Partnership Project; Technical Specification Group Services and System Aspects; Codec for Enhanced Voice Services (EVS); Detailed Algorithmic Description (Release 14)—675 pages., Dec. 2017.
“”3GPP TS 26.445 V16.2.0, 3rd Generation Partnership Project, Technical Specification Group Services and System Aspects, Codec for Enhanced Voice Services (EVS), Detailed Algorithmic Description, (Release 16), Dec. 2021.
“”3GPP TS 26.445 V17.0.0, 3rd Generation Partnership Project, Technical Specification Group Services and System Aspects, Codec for Enhanced Voice Services (EVS), Detailed Algorithmic Description, (Release 17), Apr. 2022.
“”Convolution theorem—Wikipedia.
“”3GPP TS 26.447 V14.0.0, 3rd Generation Partnership Project, Technical Specification Group Services and System Aspects, Codec for Enhanced Voice Services (EVS), Error Concealment of Lost Packets (Release 14), Mar. 2017.
“”3GPP TS 26.447 V16.0.0 (Mar. 2019)—3rd Generation Partnership Project; Technical Specification Group Services and System Aspects; Codec for Enhanced Voice Services (EVS); Error Concealment of Lost Packets (Release 16)—82 pages., Mar. 2019.
“”3GPP TS 26.290 V10.0.0, 3rd Generation Partnership Project, Technical Specification Group Services and System Aspects, Audio codec processing functions, Extended Adaptive Multi-Rate—Wideband (AMR-WB+) codec, Transcoding functions (Release 10), Mar. 2011.
“”3GPP TS 26.447 V14.2.0, 3rd Generation Partnership Project, Technical Specification Group Services and System Aspects, Codec for Enhanced Voice Services (EVS), Error Concealment of Lost Packets, (Release 14), Jun. 2020.
“”3GPP TS 26.290 V2.0.0, 3rd Generation Partnership Project; Technical Specification Group Service and System Aspects, Audio codec processing functions; Extended AMR Wideband codec, Transcoding functions (Release 6), Sep. 2004.
“”3GPP TS 26.290 version 6.1.0 Release 6), Universal Mobile Telecommunications System (UMTS), Audio codec processing functions, Extended Adaptive Multi-Rate—Wideband (AMR-WB+) codec, Transcoding functions, Dec. 2004.
“Annex A: Comfort noise aspects”, ITU-T G.722.2, of the Telecommunication Standardization Sector of the International Telecommunication Union (“G.722.2”), Jan. 2002, 16 pp.
“Qualification Deliverables for the Fraunhofer IIS Candidate for EVS (including Technical Description and Report on Compliance to Design Constraints)”, Fraunhofer IIS: Tdoc S4-130345, TSG SA4#72bis meeting, Mar. 11-15, 2013, San Diego, Mar. 11, 2013, 8 pp.
“Wideband Coding of Speech at around 16 kbit/s using Adaptive Multi-Rate Wideband (AMR-WB)”, ITU-T G.722, Series G: Transmission Systems and Media, Digital Systems and Networks, Digital terminal equipments—Coding of analogue signals by methods other than PCM, Jul. 2003, 72 pp.
Bosi, Marina, “Introduction to Digital Audio Coding and Standards”, Springer 2003, 2003, 442 pp.
Clark, G., “A unified approach to time- and frequency-domain realization of FIR adaptive digital filters”, In IEEE Transactions on Acoustics, Speech, and Signal Processing, vol. 31, No. 5, pp. 1073-1083, Oct. 1983.
Fuchs, Guillaume, “MDCT-Based Coder For Highly Adaptive Speech and Audio Coding”, 17th European Signal Processing Conference (EUSIPCO 2009), Glasgow, Scotland, Aug. 24-28, 2009, Aug. 24, 2009, 5 pp.
Hou, Huan, “Real-time Audio Error Concealment Method Based on Sinusoidal Model,”, International Conference on audio Language and Image Processing, IEEE, Jul. 2008, Shanghai, P.R. China, DOI: 10.1109/ICALIP.2008.4590009, Aug. 2008, 8 pp.
Kondoz, “Digital Speech: Coding for Low bit Rate Communication Systems”, (John Wiley & Sons 2004).
Lecomte, “An Improved Low Complexity AMR-WB+ Encoder using Neural Networks for Mode Selection”, AES 123rd Convention, New York, NY, USA, Oct. 5-8, 2007m Convention Paper 7294 section 2.1.2.
Malvar, Henrique S., “Signal Processing with Lapped Transforms”, Computer Science Engineering, 1992 , Chapter 5.
Oh, H, “A Fast Quantization Loop Algorithm for MP3/AAC Encoders”, AES 29th International Conference (2006).
Ostergaar, Jan, “Real-Time Perceptual Moving-Horizon Multiple-Description Audio Coding”, IEEE Transactions On Signal Processing, 4286 (2011), 2011, 14 pp.
Ravishankar, Channasandra, “Speech Coding”, Hughes Network Systems, Germantown, MD. United States, https://doi.org/10.2172/325392, May 8, 1998, 144 pp.
Schnell, Markus, “Low Delay Filterbanks For Enhanced Low Delay Audio Coding”, 2007 IEEE Workshop on Applications of Signal Processing to Audio and Acoustics Oct. 21, 2007, Oct. 21, 2007, 4 pp.
Virette, David, “Low Delay Transform for High Quality Low Delay Audio Coding”, Signal and Image Processing, (Université de Rennes 1, 2012), 40-41, Jan. 2012, 197 pp.
Warren, J.D., “Analysis of the spectral envelope of sounds by the human brain”, NEUROIMAGE. Feb. 15, 2005;24(4):1052-7, https://pubmed.ncbi.nlm.nih.gov/15670682/#:~:text=Spectral%20envelope%20is%20the%20shape,of%20sounds%20such%20as%20vowels.
“ISO/IEC FDIS 23003-3”, Information Technology—MPEG Audio Technologies—Part 3: Unified Speech and Audio Coding, Sep. 20, 2011, i-285.
3GPP , “Digital Cellular Telecommunications System (Phase 2+)”, Universal Mobile Telecommunications System (UMTS); LTE; Audio Codec Processing Functions; Extended Adaptive Multi-Rate-Wideband (AMR-WB+) codec; Transcoding functions3GPP TS 26.290 version 10.0.0 Release 10, 2011, pp. 1-86.
Makinen, Jari , et al., “AMR-WB+: A New Audio Coding Standard for 3rd Generation Mobile Audio Services”, in Proc. ICASSP 2005, Philadelphia, USA.
Neuendorf, Max , et al., “MPEG Unified Speech and Audio Coding—The ISO/MPEG Standard for High-Efficiency Audio Coding of all

(56) References Cited

OTHER PUBLICATIONS

Content Types", Audio Engineering Society Convention Paper 8654, Presented at the 132nd Convention—Apr. 26, 2012, pp. 1-22.
Yan-Ning, Bai , et al., "Non-uniform and Part-searching-area Algebraic Codebook for Code Excited Linear Prediction Speech Coder", Journal of Electronics & Information Technology.

* cited by examiner

LOW-FREQUENCY EMPHASIS FOR LPC-BASED CODING IN FREQUENCY DOMAIN

CROSS-REFERENCE TO RELATED APPLICATIONS

This application is a continuation of copending U.S. patent application Ser. No. 17/992,496 filed Nov. 22, 2022, which is a continuation of U.S. patent application Ser. No. 16/899,328, filed Jun. 11, 2020 (U.S. Pat. No. 11,568,883 issued Jan. 31, 2023), which is a continuation of U.S. patent application Ser. No. 15/956,591, filed Apr. 18, 2018 (U.S. Pat. No. 10,692,513 issued Jun. 23, 2020), which in turn is a continuation of U.S. patent application Ser. No. 14/811,716, filed Jul. 28, 2015 (U.S. Pat. No. 10,176,817 filed Jan. 8, 2019), which in turn is a continuation of copending International Application No. PCT/EP2014/051585, filed Jan. 28, 2014, which is incorporated herein by reference in its entirety, and additionally claims priority from US Application No. 61/758,103, filed Jan. 29, 2013, which is also incorporated herein by reference in its entirety.

BACKGROUND OF THE INVENTION

It is well-known that non-speech signals, e.g. musical sound, can be more complicated in processing than human vocal sound, occupying a wider band of frequency. Recent state-of-the-art audio coding systems such as AMR-WB+ [3] and xHE-AAC [4] offer a transform coding tool for music and other generic, non-speech signals. This tool is commonly known as transform coded excitation (TCX) and is based on the principle of transmission of a linear predictive coding (LPC) residual, termed excitation, quantized and entropy coded in the frequency domain. Due to the limited order of the predictor used in the LPC stage, however, artifacts can occur in the decoded signal especially at low frequencies, where human hearing is very sensitive.

To this end, a low-frequency emphasis and de-emphasis scheme was introduced in [1-3].

Said conventional adaptive low-frequency emphasis (ALFE) scheme amplifies low-frequency spectral lines prior to quantization in the encoder. In particular, low-frequency lines are grouped into bands, the energy of each band is computed, and the band with the local energy maximum is found. Based on the value and location of the energy maximum, bands below the maximum-energy band are boosted so that they are quantized more accurately in the subsequent quantization.

The low-frequency de-emphasis performed to invert the ALFE in a corresponding decoder is conceptually very similar. As done in the encoder, low-frequency bands are established and a band with maximum energy is determined. Unlike in the encoder, the bands below the energy peak are now attenuated. This procedure roughly restores the line energies of the original spectrum.

It is worth noting that in the known technology, the band-energy calculation in the encoder is performed before quantization, i.e. on the input spectrum, whereas in the decoder it is conducted on the inversely quantized lines, i.e. the decoded spectrum. Although the quantization operation can be designed such that spectral energy is preserved on average, exact energy preservation cannot be assured for individual spectral lines. Hence, the ALFE cannot be perfectly inverted. Moreover, a square-root operation is necessitated in an implementation of the conventional ALFE in both encoder and decoder. Avoiding such relatively complex operations is desirable.

SUMMARY

According to an embodiment, an audio encoder for encoding a non-speech audio signal so as to produce therefrom a bitstream may have: a combination of a linear predictive coding filter having a plurality of linear predictive coding coefficients and a time-frequency converter, wherein the combination is configured to filter and to convert a frame of the audio signal into a frequency domain in order to output a spectrum based on the frame and on the linear predictive coding coefficients; a low frequency emphasizer configured to calculate a processed spectrum based on the spectrum, wherein spectral lines of the processed spectrum representing frequencies lower than a reference spectral line are emphasized; a control device configured to control the calculation of the processed spectrum by the low frequency emphasizer depending on the linear predictive coding coefficients of the linear predictive coding filter; a quantization device configured to produce a quantized spectrum based on the processed spectrum; and a bitstream producer configured to embed the quantized spectrum and the linear predictive coding coefficients into the bitstream; wherein the control device has a spectral analyzer configured to estimate a spectral representation of the linear predictive coding coefficients and a minimum-maximum analyzer configured to estimate a minimum of the spectral representation and a maximum of the spectral representation below a further reference spectral line; wherein the control device is configured in such way that the spectral lines of the processed spectrum representing frequencies lower than the reference spectral line are emphasized only if the maximum is less than the minimum multiplied with a first preset value.

According to another embodiment, an audio decoder for decoding a bitstream based on a non-speech audio signal so as to produce from the bitstream a non-speech audio output signal, the bitstream having a quantized spectrum and a plurality of linear predictive coding coefficients, may have: a bitstream receiver configured to extract the quantized spectrum and the linear predictive coding coefficients from the bitstream; a de-quantization device configured to produce a de-quantized spectrum based on the quantized spectrum; a low frequency de-emphasizer configured to calculate a reverse processed spectrum based on the de-quantized spectrum, wherein spectral lines of the reverse processed spectrum representing frequencies lower than a reference spectral line are deemphasized; and a control device configured to control the calculation of the reverse processed spectrum by the low frequency de-emphasizer depending on the linear predictive coding coefficients comprised in the bitstream; wherein the control device has a spectral analyzer configured to estimate a spectral representation of the linear predictive coding coefficients and a minimum-maximum analyzer configured to estimate a minimum of the spectral representation and a maximum of the spectral representation below a further reference spectral line; wherein the control device is configured in such a way that the spectral lines of the reverse processed spectrum representing frequencies lower than the reference spectral line are de-emphasized only if the maximum is less than the minimum multiplied with a first preset value.

According to another embodiment, a system may have a decoder and an encoder, wherein the encoder is designed according to the inventive encoder as mentioned above and/or the decoder is designed according to the inventive decoder as mentioned above.

According to another embodiment, a method for encoding a non-speech audio signal so as to produce therefrom a bitstream, may have the steps of: filtering with a linear predictive coding filter having a plurality of linear predictive coding coefficients and converting a frame of the audio signal into a frequency domain in order to output a spectrum based on the frame and on the linear predictive coding coefficients; calculating a processed spectrum based on the spectrum, wherein spectral lines of the processed spectrum representing a lower frequency than a reference spectral line are emphasized; estimating a spectral representation of the linear predictive coding coefficients; estimating a minimum of the spectral representation and a maximum of the spectral representation below a further reference spectral line; controlling the calculation of the processed spectrum depending on the linear predictive coding coefficients of the linear predictive coding filter, wherein the spectral lines of the processed spectrum representing a lower frequency than the reference spectral line are emphasized only if the maximum is less than the minimum multiplied with a first preset value; producing a quantized spectrum based on the processed spectrum; and embedding the quantized spectrum and the linear predictive coding coefficients into the bitstream.

According to still another embodiment, a method for decoding a bitstream based on a non-speech audio signal so as to produce from the bitstream a non-speech audio output signal, the bitstream having a quantized spectrum and a plurality of linear predictive coding coefficients, may have the steps of: extracting the quantized spectrum and the linear predictive coding coefficients from the bitstream; producing a de-quantized spectrum based on the quantized spectrum; calculating a reverse processed spectrum based on the de-quantized spectrum, wherein spectral lines of the reverse processed spectrum representing a lower frequency than a reference spectral line are deemphasized; estimating a spectral representation of the linear predictive coding coefficients; estimating a minimum of the spectral representation and a maximum of the spectral representation below a further reference spectral line; controlling the calculation of the reverse processed spectrum depending on the linear predictive coding coefficients comprised in the bitstream, wherein the spectral lines of the reverse processed spectrum representing a lower frequency than the reference spectral line are de-emphasized only if the maximum is less than the minimum multiplied with a first preset value.

Another embodiment may have a non-transitory digital storage medium having stored thereon a computer program for performing, when running on a computer or a processor, a method for encoding a non-speech audio signal so as to produce therefrom a bitstream, having the steps of: filtering with a linear predictive coding filter having a plurality of linear predictive coding coefficients and converting a frame of the audio signal into a frequency domain in order to output a spectrum based on the frame and on the linear predictive coding coefficients; calculating a processed spectrum based on the spectrum, wherein spectral lines of the processed spectrum representing a lower frequency than a reference spectral line are emphasized; estimating a spectral representation of the linear predictive coding coefficients; estimating a minimum of the spectral representation and a maximum of the spectral representation below a further reference spectral line; controlling the calculation of the processed spectrum depending on the linear predictive coding coefficients of the linear predictive coding filter, wherein the spectral lines of the processed spectrum representing a lower frequency than the reference spectral line are emphasized only if the maximum is less than the minimum multiplied with a first preset value; producing a quantized spectrum based on the processed spectrum; and embedding the quantized spectrum and the linear predictive coding coefficients into the bitstream.

Another embodiment may have a non-transitory digital storage medium having stored thereon a computer program for performing, when running on a computer or a processor, a method for decoding a bitstream based on a non-speech audio signal so as to produce from the bitstream a non-speech audio output signal, the bitstream having a quantized spectrum and a plurality of linear predictive coding coefficients, having the steps of: extracting the quantized spectrum and the linear predictive coding coefficients from the bitstream; producing a de-quantized spectrum based on the quantized spectrum; calculating a reverse processed spectrum based on the de-quantized spectrum, wherein spectral lines of the reverse processed spectrum representing a lower frequency than a reference spectral line are deemphasized; estimating a spectral representation of the linear predictive coding coefficients; estimating a minimum of the spectral representation and a maximum of the spectral representation below a further reference spectral line; controlling the calculation of the reverse processed spectrum depending on the linear predictive coding coefficients comprised in the bitstream, wherein the spectral lines of the reverse processed spectrum representing a lower frequency than the reference spectral line are de-emphasized only if the maximum is less than the minimum multiplied with a first preset value In one aspect the invention provides an audio encoder for encoding a non-speech audio signal so as to produce therefrom a bitstream, the audio encoder comprising:

a combination of a linear predictive coding filter having a plurality of linear predictive coding coefficients and a time-frequency converter, wherein the combination is configured to filter and to convert a frame of the audio signal into a frequency domain in order to output a spectrum based on the frame and on the linear predictive coding coefficients;

a low-frequency emphasizer configured to calculate a processed spectrum based on the spectrum, wherein spectral lines of the processed spectrum representing a lower frequency than a reference spectral line are emphasized; and a control device configured to control the calculation of the processed spectrum by the low-frequency emphasizer depending on the linear predictive coding coefficients of the linear predictive coding filter.

A linear predictive coding filter (LPC filter) is a tool used in audio signal processing and speech processing for representing the spectral envelope of a framed digital signal of sound in compressed form, using the information of a linear predictive model.

A time-frequency converter is a tool for converting in particular a framed digital signal from the time domain into a frequency domain so as to estimate a spectrum of the signal. The time-frequency converter may use a modified discrete cosine transform (MDCT), which is a lapped transform based on the type-IV discrete cosine transform (DCT-IV), with the additional property of being lapped: it is designed to be performed on consecutive frames of a larger dataset, where subsequent frames are overlapped so that the last half of one frame coincides with the first half of the next frame. This overlapping, in addition to the energy-compaction qualities of the DCT, makes the MDCT especially attractive for signal compression applications, since it helps to avoid artifacts stemming from the frame boundaries.

The low-frequency emphasizer is configured to calculate a processed spectrum based on the spectrum, wherein spectral lines of the processed spectrum representing a lower frequency than a reference spectral line are emphasized so that only low frequencies contained in the processed spectrum are emphasized. The reference spectral line may be predefined based on empirical experience.

The control device is configured to control the calculation of the processed spectrum by the low-frequency emphasizer depending on the linear predictive coding coefficients of the linear predictive coding filter. Therefore, the encoder according to the invention does not need to analyze the spectrum of the audio signal for the purpose of low-frequency emphasis. Further, since identical linear predictive coding coefficients may be used in the encoder and in a subsequent decoder, the adaptive low-frequency emphasis is fully invertible regardless of spectrum quantization as long as the linear predictive coding coefficients are transmitted to the decoder in the bitstream which is produced by the encoder or by any other means. In general the linear predictive coding coefficients have to be transmitted in the bitstream anyway for the purpose of reconstructing an audio output signal from the bitstream by a respective decoder. Therefore, the bit rate of the bitstream will not be increased by the low-frequency emphasis as described herein.

The adaptive low-frequency emphasis system described herein may be implemented in the TCX core-coder of LD-USAC (EVS), a low-delay variant of xHE-AAC [4] which can switch between time-domain and MDCT-domain coding on a per-frame basis.

According to an embodiment of the invention the frame of the audio signal is input to the linear predictive coding filter, wherein a filtered frame is output by the linear predictive coding filter and wherein the time-frequency converter is configured to estimate the spectrum based on the filtered frame. Accordingly, the linear predictive coding filter may operate in the time domain, having the audio signal as its input.

According to an embodiment of the invention the frame of the audio signal is input to the time-frequency converter, wherein a converted frame is output by the time-frequency converter and wherein the linear predictive coding filter is configured to estimate the spectrum based on the converted frame. Alternatively but equivalently, to the first embodiment of the inventive encoder having a low-frequency emphasizer, the encoder may calculate a processed spectrum based on the spectrum of a frame produced by means of frequency-domain noise shaping (FDNS), as disclosed for example in [5]. More specifically, the tool ordering here is modified: the time-frequency converter such as the above-mentioned one may be configured to estimate a converted frame based on the frame of the audio signal and the linear predictive coding filter is configured to estimate the audio spectrum based on the converted frame, which is output by the time-frequency converter. Accordingly, the linear predictive coding filter may operate in the frequency domain (instead of the time domain), having the converted frame as its input, with the linear predictive coding filter applied via multiplication by a spectral representation of the linear predictive coding coefficients.

It should be evident to those skilled in the art that these two approaches—a linear filtering in the time domain followed by time-frequency conversion vs. time-frequency conversion followed by linear filtering via spectral weighting in the frequency domain—can be implemented such that they are equivalent.

According to an embodiment of the invention the audio encoder comprises a quantization device configured to produce a quantized spectrum based on the processed spectrum and a bitstream producer configured to embed the quantized spectrum and the linear predictive coding coefficients into the bitstream. Quantization, in digital signal processing, is the process of mapping a large set of input values to a (countable) smaller set—such as rounding values to some unit of precision. A device or algorithmic function that performs quantization is called a quantization device. The bitstream producer may be any device which is capable of embedding digital data from different sources into a unitary bitstream. By these features a bitstream produced with an adaptive low-frequency emphasis may be produced easily, wherein the adaptive low-frequency emphasis is fully invertible by a subsequent decoder solely using information already contained in the bitstream.

In an embodiment of the invention the control device comprises a spectral analyzer configured to estimate a spectral representation of the linear predictive coding coefficients, a minimum-maximum analyzer configured to estimate a minimum of the spectral representation and a maximum of the spectral representation below a further reference spectral line, and an emphasis factor calculator configured to calculate spectral line emphasis factors for calculating the spectral lines of the processed spectrum representing a lower frequency than the reference spectral line based on the minimum and on the maximum, wherein the spectral lines of the processed spectrum are emphasized by applying the spectral line emphasis factors to spectral lines of the spectrum of the filtered frame. The spectral analyzer may be a time-frequency converter as described above. The spectral representation is the transfer function of the linear predictive coding filter and may be, but does not have to be, the same spectral representation as the one utilized for FDNS, as described above. The spectral representation may be computed from an odd discrete Fourier transform (ODFT) of the linear predictive coding coefficients. In xHE-AAC and LD-USAC, the transfer function may be approximated by 32 or 64 MDCT-domain gains that cover the entire spectral representation.

In an embodiment of the invention the emphasis factor calculator is configured in such a way that the spectral line emphasis factors increase in a direction from the reference spectral line to the spectral line representing the lowest frequency of the spectrum. This means that the spectral line representing the lowest frequency is amplified the most whereas the spectral line adjacent to the reference spectral line is amplified the least. The reference spectral line and spectral lines representing higher frequencies than the reference spectral line are not emphasized at all. This reduces the computational complexity without any audible disadvantages.

In an embodiment of the invention the emphasis factor calculator comprises a first stage configured to calculate a basis emphasis factor according to a first formula $\gamma=(\alpha\cdot\min/\max)^{\beta}$, wherein $\alpha$ is a first preset value, with $\alpha>1$, $\beta$ is a second preset value, with $0<\beta\leq 1$, min is the minimum of the spectral representation, max is the maximum of the spectral representation, and $\gamma$ is the basis emphasis factor, and wherein the emphasis factor calculator comprises a second stage configured to calculate spectral line emphasis factors according to a second formula $\varepsilon_i=\gamma^{i'-i}$, wherein i' is a number of the spectral lines to be emphasized, i is an index of the respective spectral line, the index increases with the frequencies of the spectral lines, with i=0 to i'−1, $\gamma$ is the basis emphasis factor and $\varepsilon_i$ is the spectral line emphasis factor with index i. The basis emphasis factor is calculated from a ratio of the minimum and the maximum by the first formula in an easy way. The basis emphasis factor serves as a basis for the calculation of all spectral line emphasis factors, wherein the second formula ensures that the spectral line emphasis factors increase in a direction from the reference spectral line to the spectral line representing the lowest frequency of the spectrum. In contrast to conventional solutions the proposed solution does not necessitate a per-spectral-band square-root or similar complex operation. Only 2 division and 2 power operators are needed, one of each on encoder and decoder side.

In an embodiment of the invention the first preset value is smaller than 42 and larger than 22, in particular smaller than 38 and larger than 26, more particular smaller 34 and larger than 30. The aforementioned intervals are based on empirical experiments. Best results may be achieved when the first preset value is set to 32.

In an embodiment of the invention the second preset value is determined according to the formula $\beta=1/(\theta\cdot i')$, wherein i' is a number of the spectral lines being emphasized, $\theta$ is a factor between 3 and 5, in particular between 3.4 and 4.6, more particular between 3.8 and 4.2. Also these intervals are based on empirical experiments. It has been found the best results may be achieved when the second preset value is set to 4.

In an embodiment of the invention the reference spectral line represents a frequency between 600 Hz and 1000 Hz, in particular between 700 Hz and 900 Hz, more particular between 750 Hz and 850 Hz. These empirically found intervals ensure sufficient low-frequency emphasis as well as a low computational complexity of the system. These intervals ensure in particular that in densely populated spectra, the lower-frequency lines are coded with sufficient accuracy. In an embodiment the reference spectral line represents 800 Hz, wherein 32 spectral lines are emphasized.

In an embodiment of the invention the further reference spectral line represents the same or a higher frequency than the reference spectral line. These features ensure that the estimation of the minimum and the maximum is done in the relevant frequency range.

In the embodiment of the invention the control device is configured in such a way that the spectral lines of the processed spectrum representing a lower frequency than the reference spectral are emphasized only if the maximum is less than the minimum multiplied with a, the first preset value. These features ensure that low-frequency emphasis is only executed when needed so that the work load of the encoder may be minimized and no bits are wasted on perceptually unimportant regions during spectral quantization.

In one aspect the invention provides an audio decoder for decoding a bitstream based on a non-speech audio signal so as to produce from the bitstream a decoded non-speech audio output signal, in particular for decoding a bitstream produced by an audio encoder according to the invention, the bitstream containing quantized spectrums and a plurality of linear predictive coding coefficients, the audio decoder comprising:

a bitstream receiver configured to extract the quantized spectrum and the linear predictive coding coefficients from the bitstream;

a de-quantization device configured to produce a de-quantized spectrum based on the quantized spectrum;

a low-frequency de-emphasizer configured to calculate a reverse processed spectrum based on the de-quantized spectrum, wherein spectral lines of the reverse processed spectrum representing a lower frequency than a reference spectral line are de-emphasized; and a control device configured to control the calculation of the reverse processed spectrum by the low-frequency de-emphasizer depending on the linear predictive coding coefficients contained in the bitstream.

The bitstream receiver may be any device which is capable of classifying digital data from a unitary bitstream so as to send the classified data to the appropriate subsequent processing stage. In particular, the bitstream receiver is configured to extract the quantized spectrum, which then is forwarded to the de-quantization device, and the linear predictive coding coefficients, which then are forwarded to the control device, from the bitstream.

The de-quantization device is configured to produce a de-quantized spectrum based on the quantized spectrum, wherein de-quantization is an inverse process with respect to quantization as explained above.

The low-frequency de-emphasizer is configured to calculate a reverse processed spectrum based on the de-quantized spectrum, wherein spectral lines of the reverse processed spectrum representing a lower frequency than a reference spectral line are de-emphasized so that only low frequencies contained in the reverse processed spectrum are de-emphasized. The reference spectral line may be predefined based on empirical experience. It has to be noted that the reference spectral line of the decoder should represent the same frequency as the reference spectral line of the encoder as explained above. However, the frequency to which the reference spectral line refers may be stored on the decoder side so that it is not necessitated to transmit this frequency in the bitstream.

The control device is configured to control the calculation of the reverse processed spectrum by the low-frequency de-emphasizer depending on the linear predictive coding coefficients of the linear predictive coding filter. Since identical linear predictive coding coefficients may be used in the encoder producing the bitstream and in the decoder, the adaptive low-frequency emphasis is fully invertible regardless of spectrum quantization as long as the linear predictive coding coefficients are transmitted to the decoder in the bitstream. In general the linear predictive coding coefficients have to be transmitted in the bitstream anyway for the purpose of reconstructing the audio output signal from the bitstream by the decoder. Therefore, the bit rate of the bitstream will not be increased by the low-frequency emphasis and the low-frequency de-emphasis as described herein.

The adaptive low-frequency de-emphasis system described herein may be implemented in the TCX core-coder of LD-USAC, a low-delay variant of xHE-AAC [4] which can switch between time-domain and MDCT-domain coding.

By these features a bitstream produced with an adaptive low-frequency emphasis may be decoded easily, wherein the adaptive low-frequency de-emphasis may be done by the decoder solely using information already contained in the bitstream.

According to an embodiment of the invention the audio decoder comprises combination of a frequency-time converter and an inverse linear predictive coding filter receiving the plurality of linear predictive coding coefficients contained in the bitstream, wherein the combination is configured to inverse-filter and to convert the reverse processed spectrum into a time domain in order to output the output signal based on the reverse processed spectrum and on the linear predictive coding coefficients.

A frequency-time converter is a tool for executing an inverse operation of the operation of a time-frequency converter as explained above. It is a tool for converting in particular a spectrum of a signal in a frequency domain into a framed digital signal in the time domain so as to estimate the original signal. The frequency-time converter may use an inverse modified discrete cosine transform (inverse MDCT), wherein the modified discrete cosine transform is a lapped transform based on the type-IV discrete cosine transform (DCT-IV), with the additional property of being lapped: it is designed to be performed on consecutive frames of a larger dataset, where subsequent frames are overlapped so that the last half of one frame coincides with the first half of the next frame. This overlapping, in addition to the energy-compaction qualities of the DCT, makes the MDCT especially attractive for signal compression applications, since it helps to avoid artifacts stemming from the frame boundaries. Those skilled in the art will understand that other transforms are possible. However, the transform in the decoder should be an inverse transform of the transform in the encoder.

An inverse linear predictive coding filter is a tool for executing an inverse operation to the operation done by the linear predictive coding filter (LPC filter) as explained above. It is a tool used in audio signal processing and speech processing for decoding of the spectral envelope of a framed digital signal in order to reconstruct the digital signal, using the information of a linear predictive model. Linear predictive coding and decoding is fully invertible as long as the same linear predictive coding coefficients are used, which may be ensured by transmitting the linear predictive coding coefficients from the encoder to the decoder embedded in the bitstream as described herein.

By these features the output signal may be processed in an easy way.

According to an embodiment of the invention the frequency-time converter is configured to estimate a time signal based on the reverse processed spectrum, wherein the inverse linear predictive coding filter is configured to output the output signal based on the time signal. Accordingly, the inverse linear predictive coding filter may operate in the time domain, having the time signal as its input.

According to an embodiment of the invention the inverse linear predictive coding filter is configured to estimate an inverse filtered signal based on the reverse processed spectrum, wherein the frequency-time converter is configured to output the output signal based on the inverse filtered signal.

Alternatively and equivalently, and analogous to the above-described FDNS procedure performed on the encoder side, the order of the frequency-time converter and the inverse linear predictive coding filter may be reversed such that the latter is operated first and in the frequency domain (instead of the time domain). More specifically, the inverse linear predictive coding filter may output an inverse filtered signal based on the reverse processed spectrum, with the inverse linear predictive coding filter applied via multiplication (or division) by a spectral representation of the linear predictive coding coefficients, as in [5]. Accordingly, a frequency-time converter such as the above-mentioned one may be configured to estimate a frame of the output signal based on the inverse filtered signal, which is input to the frequency-time converter.

It should be evident to those skilled in the art that these two approaches—a linear inverse filtering via spectral weighting in the frequency domain followed by frequency-time conversion vs. frequency-time conversion followed by linear inverse filtering in the time domain—can be implemented such that they are equivalent.

In an embodiment of the invention the control device comprises a spectral analyzer configured to estimate a spectral representation of the linear predictive coding coefficients, a minimum-maximum analyzer configured to estimate a minimum of the spectral representation and a maximum of the spectral representation below a further reference spectral line and a de-emphasis factor calculator configured to calculate spectral line de-emphasis factors for calculating the spectral lines of the reverse processed spectrum representing a lower frequency than the reference spectral line based on the minimum and on the maximum, wherein the spectral lines of the reverse processed spectrum are de-emphasized by applying the spectral line de-emphasis factors to spectral lines of the de-quantized spectrum. The spectral analyzer may be a time-frequency converter as described above. The spectral representation is the transfer function of the linear predictive coding filter and may be, but does not have to be, the same spectral representation as the one utilized for FDNS, as described above. The spectral representation may be computed from an odd discrete Fourier transform (ODFT) of the linear predictive coding coefficients. In xHE-AAC and LD-USAC, the transfer function may be approximated by 32 or 64 MDCT-domain gains that cover the entire spectral representation.

In an embodiment of the invention the de-emphasis factor calculator is configured in such a way that the spectral line de-emphasis factors decrease in a direction from the reference spectral line to the spectral line representing the lowest frequency of the reverse processed spectrum. This means that the spectral line representing the lowest frequency is attenuated the most whereas the spectral line adjacent to the reference spectral line is attenuated the least. The reference spectral line and spectral lines representing higher frequencies than the reference spectral line are not de-emphasized at all. This reduces the computational complexity without any audible disadvantages.

In an embodiment of the invention the de-emphasis factor calculator comprises a first stage configured to calculate a basis de-emphasis factor according to a first formula $\delta=(\alpha\cdot\min/\max)^{-\beta}$, wherein $\alpha$ is a first preset value, with $\alpha>1$, $\beta$ is a second preset value, with $0<\beta\leq 1$, min is the minimum of the spectral representation, max is the maximum of the spectral representation and $\delta$ is the basis de-emphasis factor, and wherein the de-emphasis factor calculator comprises a second stage configured to calculate spectral line de-emphasis factors according to a second formula $\zeta_i=\delta^{i'-i}$, wherein i' is a number of the spectral lines to be de-emphasized, i is an index of the respective spectral line, the index increases with the frequencies of the spectral lines, with i=0 to i'−1, $\delta$ is the basis de-emphasis factor and is the spectral line de-emphasis factor with index i. The operation of the de-emphasis factor calculator is inverse to the operation of the emphasis factor calculator as described above. The basis de-emphasis factor is calculated from a ratio of the minimum and the maximum by the first formula in an easy way. The basis de-emphasis factor serves as a basis for the calculation of all spectral line de-emphasis factors, wherein the second formula ensures that the spectral line de-emphasis factors decrease in a direction from the reference spectral line to the spectral line representing the lowest frequency of the reverse processed spectrum. In contrast to conventional solutions the proposed solution does not necessitate a per-spectral-band square-root or similar complex operation. Only 2 division and 2 power operators are needed, one of each on encoder and decoder side.

In an embodiment of the invention the first preset value is smaller than 42 and larger than 22, in particular smaller than 38 and larger than 26, more particular smaller 34 and larger than 30. The aforementioned intervals are based on empirical experiments. Best results may be achieved when the first preset value is set to 32. Note, that the first preset value of the decoder should be the same as the first preset value of the encoder.

In an embodiment of the invention the second preset value is determined according to the formula $\beta=1/(\theta\cdot i')$, wherein i' is the number of the spectral lines being de-emphasized, $\theta$ is a factor between 3 and 5, in particular between 3.4 and 4.6, more particular between 3.8 and 4.2. Best results may be achieved when the second preset value is set to 4. Note, that the second preset value of the decoder should be the same as the second preset value of the encoder.

In an embodiment of the invention the reference spectral line represents a frequency between 600 Hz and 1000 Hz, in particular between 700 Hz and 900 Hz, more particular between 750 Hz and 850 Hz. These empirically found intervals ensure sufficient low-frequency emphasis as well as a low computational complexity of the system. These intervals ensure in particular that in densely populated spectra, the lower-frequency lines are coded with sufficient accuracy. In an embodiment the reference spectral line represents 800 Hz, wherein 32 spectral lines are de-emphasized. It is obvious that the reference spectral line of the decoder should represent the same frequency as the reference spectral line of the encoder.

In an embodiment of the invention the further reference spectral line represents the same or a higher frequency than the reference spectral line. These features ensure that the estimation of the minimum and the maximum is done in the relevant frequency range, as is the case in the encoder.

In an embodiment of the invention the control device is configured in such a way that the spectral lines of the reverse processed spectrum representing a lower frequency than the reference spectral line are de-emphasized only if the maximum is less than the minimum multiplied with the first preset value a. These features ensure that low-frequency de-emphasis is only executed when needed so that the work load of the decoder may be minimized and no bits are wasted on perceptually irrelevant regions during quantization.

In one aspect the invention provides a system comprising a decoder and an encoder, wherein the encoder is designed according to the invention and/or the decoder is designed according to the invention.

In one aspect the invention provides a method for encoding a non-speech audio signal so as to produce therefrom a bitstream, the method comprising the steps:

- filtering with a linear predictive coding filter having a plurality of linear predictive coding coefficients and converting a frame of the audio signal into a frequency domain in order to output a spectrum based on the frame and on the linear predictive coding coefficients;
- calculating a processed spectrum based on the spectrum of the filtered frame, wherein spectral lines of the processed spectrum representing a lower frequency than a reference spectral line are emphasized; and
- controlling the calculation of the processed spectrum depending on the linear predictive coding coefficients of the linear predictive coding filter.

In one aspect the invention provides a method for decoding a bitstream based on a non-speech audio signal so as to produce from the bitstream a non-speech audio output signal, in particular for decoding a bitstream produced by the method according to the preceding claim, the bitstream containing quantized spectrums and a plurality of linear predictive coding coefficients, the method comprising the steps:

- extracting the quantized spectrum and the linear predictive coding coefficients from the bitstream;
- producing a de-quantized spectrum based on the quantized spectrum;
- calculating a reverse processed spectrum based on the de-quantized spectrum, wherein spectral lines of the reverse processed spectrum representing a lower frequency than a reference spectral line are de-emphasized; and
- controlling the calculation of the reverse processed spectrum depending on the linear predictive coding coefficients contained in the bitstream.

In one aspect the invention provides a computer program for performing, when running on a computer or a processor, the inventive method.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
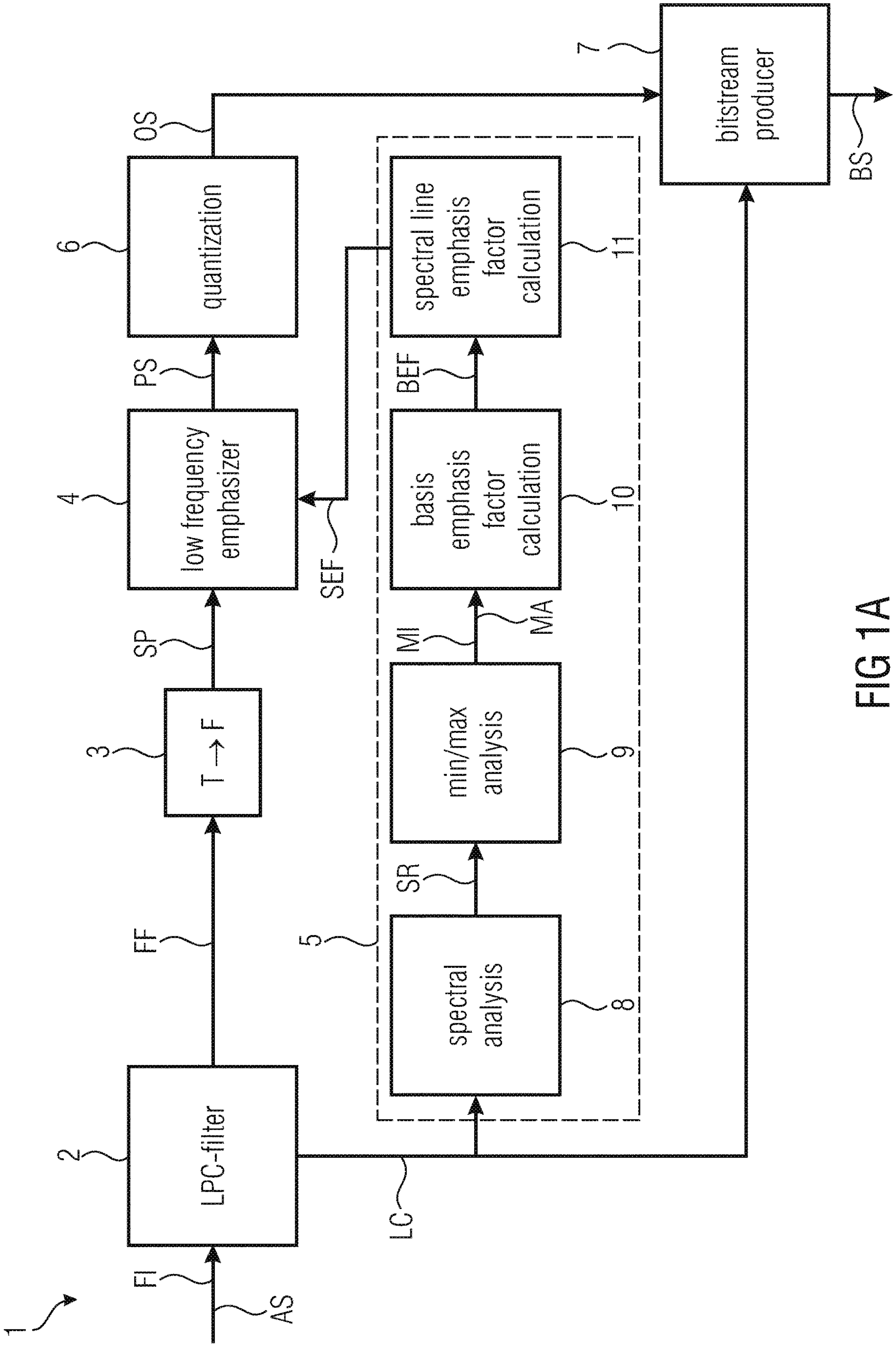
FIG. 1*a* illustrates a first embodiment of an audio encoder according to the invention.

FIG. 1*a* illustrates a first embodiment of an audio encoder 1 according to the invention. The audio encoder 1 for encoding a non-speech audio signal AS so as to produce therefrom a bitstream BS comprises

- a combination 2, 3 of a linear predictive coding filter 2 having a plurality of linear predictive coding coefficients LC and a time-frequency converter 3, wherein the combination 2, 3 is configured to filter and to convert a frame FI of the audio signal AS into a frequency domain in order to output a spectrum SP based on the frame FI and on the linear predictive coding coefficients LC;
- a low frequency emphasizer 4 configured to calculate a processed spectrum PS based on the spectrum SP, wherein spectral lines SL (see FIG. 2) of the processed spectrum PS representing a lower frequency than a reference spectral line RSL (see FIG. 2) are emphasized; and a control device 5 configured to control the calculation of the processed spectrum PS by the low frequency emphasizer 4 depending on the linear predictive coding coefficients LC of the linear predictive coding filter 2.

A linear predictive coding filter (LPC filter) 2 is a tool used in audio signal processing and speech processing for representing the spectral envelope of a framed digital signal of sound in compressed form, using the information of a linear predictive model.

A time-frequency converter 3 is a tool for converting in particular a framed digital signal from time domain into a frequency domain so as to estimate a spectrum of the signal. The time-frequency converter 3 may use a modified discrete cosine transform (MDCT), which is a lapped transform based on the type-IV discrete cosine transform (DCT-IV), with the additional property of being lapped: it is designed to be performed on consecutive frames of a larger dataset, where subsequent frames are overlapped so that the last half of one frame coincides with the first half of the next frame. This overlapping, in addition to the energy-compaction qualities of the DCT, makes the MDCT especially attractive for signal compression applications, since it helps to avoid artifacts stemming from the frame boundaries.

The low frequency emphasizer 4 is configured to calculate a processed spectrum PS based on the spectrum SP of the filtered frame FF, wherein spectral lines SL of the processed spectrum PS representing a lower frequency than a reference spectral line RSL are emphasized so that only low frequencies contained in the processed spectrum PS are emphasized. The reference spectral line RSL may be predefined based on empirical experience.

The control device 5 is configured to control the calculation of the processed spectrum SP by the low frequency emphasizer 4 depending on the linear predictive coding coefficients LC of the linear predictive coding filter 2. Therefore, the encoder 1 according to the invention does not need to analyze the spectrum SP of the audio signal AS for the purpose of low-frequency emphasis. Further, since identical linear predictive coding coefficients LC may be used in the encoder 1 and in a subsequent decoder 12 (see FIG. 5), the adaptive low-frequency emphasis is fully invertible regardless of spectrum quantization as long as the linear predictive coding coefficients LC are transmitted to the decoder 12 in the bitstream BS which is produced by the encoder 1 or by any other means. In general the linear predictive coding coefficients LC have to be transmitted in the bitstream BS anyway for the purpose of reconstructing an audio output signal OS (see FIG. 5) from the bitstream BS by a respective decoder 12. Therefore, the bit rate of the bitstream BS will not be increased by the low-frequency emphasis as described herein.

The adaptive low-frequency emphasis system described herein may be implemented in the TCX core-coder of LD-USAC, a low-delay variant of xHE-AAC [4] which can switch between time-domain and MDCT-domain coding on a per-frame basis.

According to an embodiment of the invention the frame FI of the audio signal AS is input to the linear predictive coding filter 2, wherein a filtered frame FF is output by the linear predictive coding filter 2 and wherein the time-frequency converter 3 is configured to estimate the spectrum SP based on the filtered frame FF. Accordingly, the linear predictive coding filter 2 may operate in the time domain, having the audio signal AS as its input.

According to an embodiment of the invention the audio encoder 1 comprises a quantization device 6 configured to produce a quantized spectrum QS based on the processed spectrum BS and a bitstream producer 7 and configured to embed the quantized spectrum QS and the linear predictive coding coefficients LC into the bitstream BS. Quantization, in digital signal processing, is the process of mapping a large set of input values to a (countable) smaller set—such as rounding values to some unit of precision. A device or algorithmic function that performs quantization is called a quantization device 6. The bitstream producer 7 may be any device which is capable of embedding digital data from different sources 2, 6 into a unitary bitstream BS. By these features a bitstream BS produced with an adaptive low-frequency emphasis may be produced easily, wherein the adaptive low-frequency emphasis is fully invertible by a subsequent decoder 12 solely using information contained in the bitstream BS.

In an embodiment of the invention the control device 5 comprises a spectral analyzer 8 configured to estimate a spectral representation SR of the linear predictive coding coefficients LC, a minimum-maximum analyzer 9 configured to estimate a minimum MI of the spectral representation SR and a maximum MA of the spectral representation SR below a further reference spectral line and an emphasis factor calculator 10, 11 configured to calculate spectral line emphasis factors SEF for calculating the spectral lines SL of the processed spectrum PS representing a lower frequency than the reference spectral line RSL based on the minimum MI and on the maximum MA, wherein the spectral lines SL of the processed spectrum PS are emphasized by applying the spectral line emphasis factors SL to spectral lines of the spectrum SP of the filtered frame FF. The spectral analyzer may be a time-frequency converter as described above The spectral representation SR is the transfer function of the linear predictive coding filter 2. The spectral representation SR may be computed from an odd discrete Fourier transform (ODFT) of the linear predictive coding coefficients. In xHE-AAC and LD-USAC, the transfer function may be approximated by 32 or 64 MDCT-domain gains that cover the entire spectral representation SR.

In an embodiment of the invention the emphasis factor calculator 10, 11 is configured in such way that the spectral line emphasis factors SEF increase in a direction from the reference spectral line RSL to the spectral line $SL_0$ representing the lowest frequency of the processed spectrum PS. That means that the spectral line $SL_0$ representing the lowest frequency is amplified the most whereas the spectral line $SL_{i'-1}$ adjacent to the reference spectral line is amplified the least. The reference spectral line RSL and spectral lines $SL_{i'+1}$ representing higher frequencies than the reference spectral line RSL are not emphasized at all. This reduces the computational complexity without any audible disadvantages.

In an embodiment of the invention the emphasis factor calculator 10, 11 comprises a first stage 10 configured to calculate a basis emphasis factor BEF according to a first formula $\gamma=(\alpha\cdot\min/\max)^{\beta}$, wherein $\alpha$ is a first preset value, with $\alpha>1$, $\beta$ is a second preset value, with $0<\beta\leq 1$, min is the minimum MI of the of the spectral representation SR, max is the maximum MA of the spectral representation SR and $\gamma$ is the basis emphasis factor BEF, and wherein the emphasis factor calculator 10, 11 comprises a second stage 11 configured to calculate spectral line emphasis factors SEF according to a second formula $\varepsilon_i=\gamma^{i'-i}$, wherein i' is a number of the spectral lines SL to be emphasized, i is an index of the respective spectral line SL, the index increases with the frequencies of the spectral lines SL, with i=0 to i'−1, $\gamma$ is the basis emphasis factor BEF and $\varepsilon_i$ is the spectral line emphasis factor SEF with index i. The basis emphasis factor is calculated from a ratio in the minimum and the maximum by the first formula in an easy way. The basis emphasis factor BEF serves as a basis for the calculation of all spectral line emphasis factors SEF, wherein the second formula ensures that the spectral line emphasis factors SEF increase in a direction from the reference spectral line RSL to the spectral line $SL_0$ representing the lowest frequency of the spectrum PS. In contrast to known technology solutions the proposed solution does not necessitate a per-spectral-band square-root or similar complex operation. Only 2 division and 2 power operators are needed, one of each on encoder and decoder side.

In an embodiment of the invention the first preset value is smaller than 42 and larger than 22, in particular smaller than 38 and larger than 26, more particular smaller 34 and larger than 30. The aforementioned intervals are based on empirical experiments. Best results may be achieved when the first preset value is set to 32.

In an embodiment of the invention the second preset value is determined according to the formula $\beta=1/(\theta\cdot i')$, wherein i' is a number of the spectral lines SL being emphasized, $\theta$ is a factor between 3 and 5, in particular between 3.4 and 4.6, more particular between 3.8 and 4.2. Also these intervals are based on empirical experiments. It has been found the best results may be achieved than the second preset value is set to 4.

In an embodiment of the invention the reference spectral line RSL represents a frequency between 600 Hz and 1000 Hz, in particular between 700 Hz and 900 Hz, more particular between 750 Hz and 850 Hz. These empirically found intervals ensure sufficient low-frequency emphasis as well as a low computational complexity of the system. These intervals ensure in particular that in densely populated spectra, the lower-frequency lines are coded with sufficient accuracy. In an embodiment the reference spectral line represents 800 Hz, wherein 32 spectral lines are emphasized.

The calculation of the spectral line emphasis factors SEF may be done by the following income of the program code:

```
max = tmp = lpcGains [0];
/* find minimum (tmp) and maximum (max) of LPC gains in low
frequencies */
for (i = 1; i < 9; i++) {
  if (tmp > lpcGains [i]) {
    tmp = lpcGains [i];
  }
  if (max < lpcGains [i]) {
    max = lpcGains [i];
  }
}
tmp *= 32.0f;
if ((max < tmp) && (max > FLT_MIN)) {
  fac = tmp = (float)pow(tmp / max, 0.0078125f);
  /* gradual boosting of lowest 32 bins; DC is boosted by (tmp/max)^1/4
  */
  for (i = 31; i >= 0; i--) {
    x[i] *= fac;
    fac *= tmp;
  }
}
```

In an embodiment of the invention the further reference spectral line represents a higher frequency than the reference spectral line RSL. These features ensure that the estimation of the minimum MI and the maximum MA is done in the relevant frequency range.

Figure 1B:
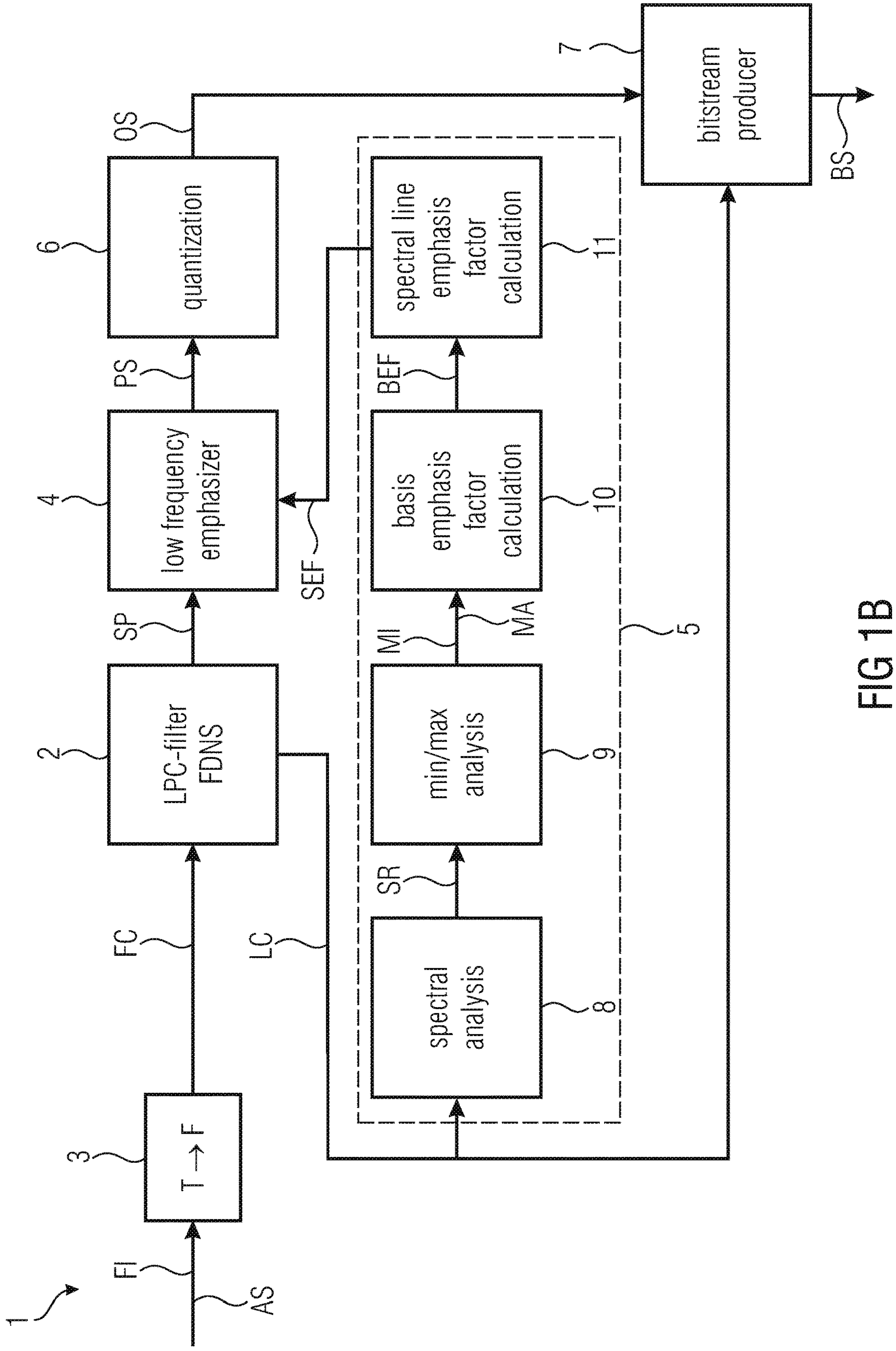
FIG. 1*b* illustrates a second embodiment of an audio encoder according to the invention.

FIG. 1b illustrates a second embodiment of an audio encoder 1 according to the invention. The second embodiment is based on the first embodiment. In the following only the differences between the two embodiments will be explained.

According to an embodiment of the invention the frame FI of the audio signal AS is input to the time-frequency converter 3, wherein a converted frame FC is output by the time-frequency converter 3 and wherein the linear predictive coding filter 2 is configured to estimate the spectrum SP based on the converted frame FC. Alternatively but equivalently to the first embodiment of the inventive encoder 1 having a low-frequency emphasizer, the encoder 1 may calculate a processed spectrum PS based on the spectrum SP of a frame FI produced by means of frequency-domain noise shaping (FDNS), as disclosed for example in [5]. More specifically, the tool ordering here is modified: the time-frequency converter 3 such as the above-mentioned one may be configured to estimate a converted frame FC based on the frame FI of the audio signal AS and the linear predictive coding filter 2 is configured to estimate the audio spectrum SP based on the converted frame FC, which is output by the time-frequency converter 3. Accordingly, the linear predictive coding filter 2 may operate in the frequency domain (instead of the time domain), having the converted frame FC as its input, with the linear predictive coding filter 2 applied via multiplication by a spectral representation of the linear predictive coding coefficients LC.

It should be evident to those skilled in the art that the first and the second embodiment—a linear filtering in the time domain followed by time-frequency conversion vs. time-frequency conversion followed by linear filtering via spectral weighting in the frequency domain—can be implemented such that they are equivalent.

Figure 2:
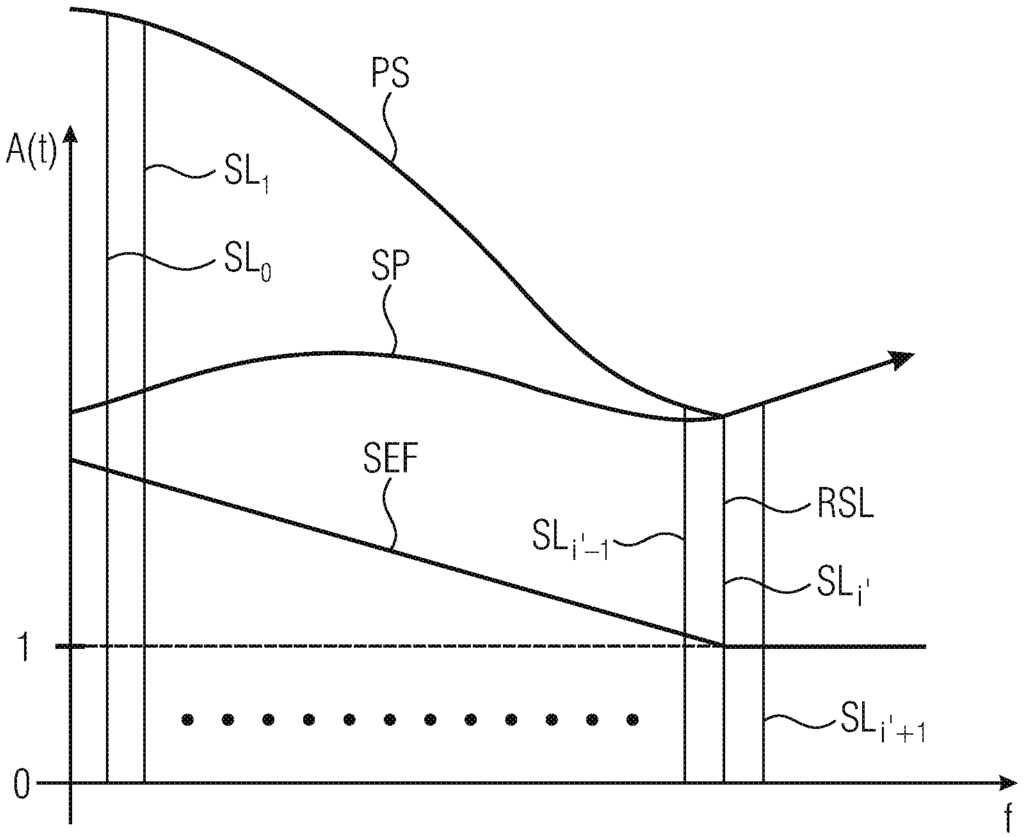
FIG. 2 illustrates a first example for low-frequency emphasis executed by an audio encoder according to the invention.

FIG. 2 illustrates a first example for low-frequency emphasis executed by an encoder according to the invention. FIG. 2 shows an exemplary spectrum SP, exemplary spectral line emphasis factors SEF and an exemplary processed spectrum SP in a common coordinate system, wherein the frequency is plotted against the x-axis and amplitude depending on the frequency is plotted against the y-axis. The spectral lines $SL_0$ to $SL_{i'-i}$, which represents frequencies lower than the reference spectrum line RSL, are amplified, whereas the reference spectral line RSL and the spectral line $SL_{i'+1}$, which represents a frequency higher than the reference spectrum RSL, are not amplified. FIG. 2 depicts a situation in which the ratio of the minimum MI and the maximum MA of the spectral representation SR of the linear predictive coding coefficients LC is close to 1. Therefore, a maximum spectral line emphasis factor SEF for the spectral line $SL_0$ is about 2.5.

Figure 3:
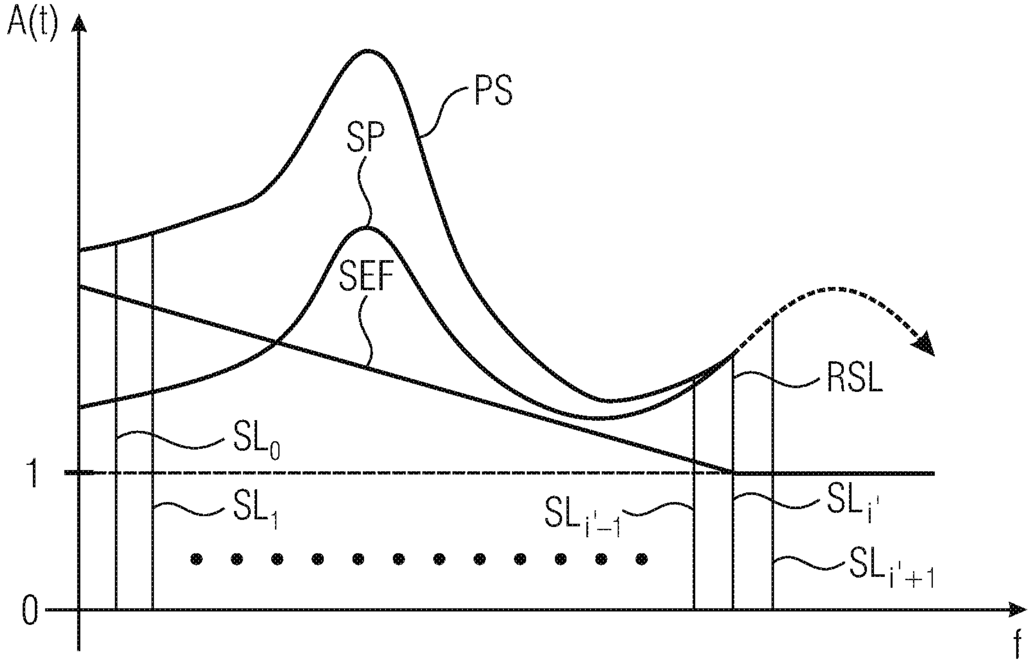
FIG. 3 illustrates a second example for low-frequency emphasis executed by an audio encoder according to the invention.

FIG. 3 illustrates a second example for low-frequency emphasis executed by an encoder according to the invention. The difference to the low-frequency emphasis as is stated in FIG. 2 is that the ratio of the minimum MI and the maximum MA of the spectral representation SR of the linear predictive coding coefficients LC is smaller. Therefore, a maximum spectral line emphasis factor SEF for the spectral line $SL_0$ is smaller, e.g. below 2.0.

Figure 4:
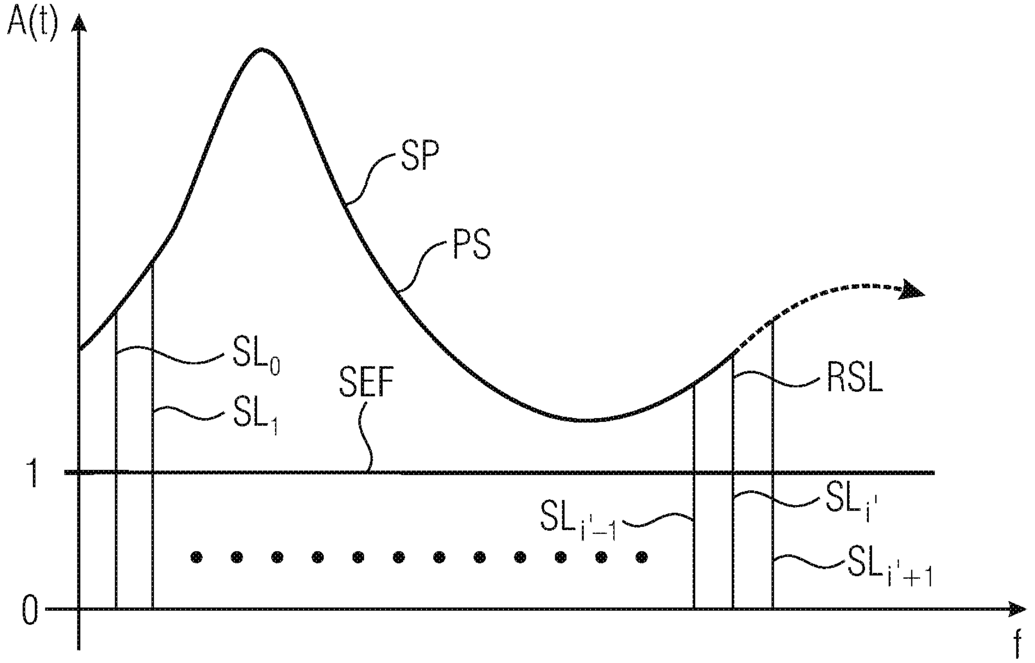
FIG. 4 illustrates a third example for low-frequency emphasis executed by an audio encoder according to the invention.

FIG. 4 illustrates a third example for low-frequency emphasis executed by an encoder according to the invention. In the embodiment of the invention the control device 5 is configured in such way that the spectral lines SL of the processed spectrum SP representing a lower frequency than the reference spectral RSL are emphasized only if the maximum is less than the minimum multiplied with the first preset value. These features ensure that low-frequency emphasis is only executed when needed so that the work load of the encoder may be minimized. In FIG. 4 these conditions are met so that no low-frequency emphasis executed.

Figure 5A:
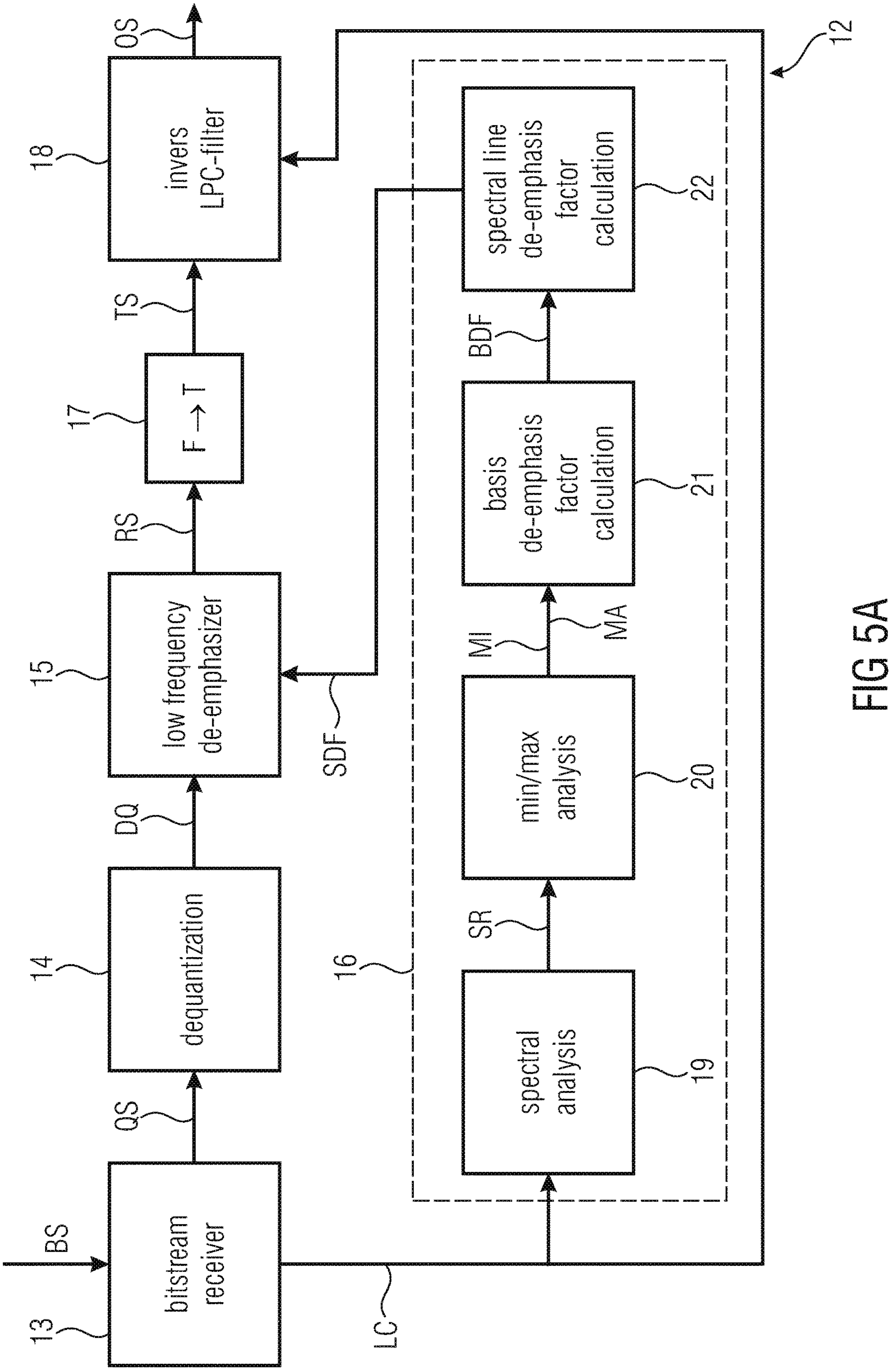
FIG. 5*a* illustrates a first embodiment of an audio decoder according to the invention.

FIG. 5 illustrates an embodiment of a decoder according to the invention. The audio decoder 12 is configured for decoding a bitstream BS based on a non-speech audio signal so as to produce from the bitstream BS a non-speech audio output signal OS, in particular for decoding a bitstream BS produced by an audio encoder 1 according to the invention, wherein the bitstream BS contains quantized spectrums QS and a plurality of linear predictive coding coefficient LC. The audio decoder 12 comprises:

- a bitstream receiver 13 configured to extract the quantized spectrum QS and the linear predictive coding coefficients LC from the bitstream BS;
- a de-quantization device 14 configured to produce a de-quantized spectrum DQ based on the quantized spectrum QS;
- a low frequency de-emphasizer 15 configured to calculate a reverse processed spectrum RS based on the de-quantized spectrum DQ, wherein spectral lines SLD of the reverse processed spectrum RS representing a lower frequency than a reference spectral line RSLD are deemphasized; and
- a control device 16 configured to control the calculation of the reverse processed spectrum RS by the low frequency de-emphasizer 15 depending on the linear predictive coding coefficients LC contained in the bitstream BS.

The bitstream receiver 13 may be any device which is capable of classifying digital data from a unitary bitstream BS so as to send the classified data to the appropriate subsequent processing stage. In particular the bitstream receiver 13 is configured to extract the quantized spectrum QS, which then is forwarded to the de-quantization device 14, and the linear predictive coding coefficients LC, which then are forwarded to the control device 16, from the bitstream BS.

The de-quantization device 16 is configured to produce a de-quantized spectrum DQ based on the quantized spectrum QS, wherein de-quantization is an inverse process with respect to quantization as explained above.

The low frequency de-emphasizer 15 is configured to calculate a reverse processed spectrum RS based on the de-quantized spectrum QS, wherein spectral lines SLD of the reverse processed spectrum RS representing a lower frequency than a reference spectral line RSLD are deemphasized so that only low frequencies contained in the reverse processed spectrum RS are de-emphasized. The reference spectral line RSLD may be predefined based on empirical experience. It has to be noted that the reference spectral line RSLD of the decoder 12 should represent the same frequency as the reference spectral line RSL of the encoder 1 as explained above. However, the frequency to which the reference spectral line RSLD refers may be stored on the decoder side so that it is not necessitated to transmit this frequency in the bitstream BS.

The control device 16 is configured to control the calculation of the reverse processed spectrum RS by the low frequency de-emphasizer 15 depending on the linear predictive coding coefficients LS of the linear predictive coding filter 2. Since identical linear predictive coding coefficients LC may be used in the encoder 1 producing the bitstream BS and in the decoder 12, the adaptive low-frequency emphasis is fully invertible regardless of spectrum quantization as long as the linear predictive coding coefficients are transmitted to the decoder 12 in the bitstream BS. In general the linear predictive coding coefficients LC have to be transmitted in the bitstream BS anyway for the purpose of reconstructing the audio output signal OS from the bitstream BS by the decoder 12. Therefore, the bit rate of the bitstream BS will not be increased by the low-frequency emphasis and the low-frequency de-emphasis as described herein.

The adaptive low-frequency de-emphasis system described herein may be implemented in the TCX core-coder of LD-USAC, a low-delay variant of xHE-AAC [4] which can switch between time-domain and MDCT-domain coding on a per-frame basis.

By these features a bitstream BS produced with an adaptive low-frequency emphasis may be decoded easily, wherein the adaptive low-frequency de-emphasis may be done by the decoder 12 solely using information contained in the bitstream BS.

According to an embodiment of the invention the audio decoder 12 comprises combination 17, 18 of a frequency-time converter 17 and an inverse linear predictive coding filter 18 receiving the plurality of linear predictive coding coefficients LC contained in the bitstream BS, wherein the combination 17, 18 is configured to inverse-filter and to convert the reverse processed spectrum RS into a time domain in order to output the output signal OS based on the reverse processed spectrum RS and on the linear predictive coding coefficients LC.

A frequency-time converter 17 is a tool for executing an inverse operation of the operation of a time-frequency converter 3 as explained above. It is a tool for converting in particular a spectrum of a signal in a frequency domain into a framed digital signal in her time domain so as to estimate the original signal. The frequency-time converter may use an inverse modified discrete cosine transform (inverse MDCT), wherein the modified discrete cosine transform is a lapped transform based on the type-IV discrete cosine transform (DCT-IV), with the additional property of being lapped: it is designed to be performed on consecutive frames of a larger dataset, where subsequent frames are overlapped so that the last half of one frame coincides with the first half of the next frame. This overlapping, in addition to the energy-compaction qualities of the DCT, makes the MDCT especially attractive for signal compression applications, since it helps to avoid artifacts stemming from the frame boundaries. Those skilled in the art will understand that other transforms are possible. However, the transform in the decoder 12 should be an inverse transform of the transform in the encoder 1.

An inverse linear predictive coding filter 18 is a tool for executing an inverse operation to the operation done by the linear predictive coding filter (LPC filter) 2 as explained above. It is a tool used in audio signal and speech signal processing for decoding of the spectral envelope of a framed digital signal in order to reconstruct the digital signal, using the information of a linear predictive model. Linear predictive coding and decoding is fully invertible as known as the same linear predictive coding coefficients used, which may be ensured by transmitting the linear predictive coding coefficients LC from the encoder 1 to the decoder 12 embedded in the bitstream BS as described herein.

By these features the output signal OS may be processed in an easy way.

According to an embodiment of the invention the frequency-time converter 17 is configured to estimate a time signal TS based on the reverse processed spectrum RS, wherein the inverse linear predictive coding filter 18 is configured to output the output signal OS based on the time signal TS. Accordingly, the inverse linear predictive coding filter 18 may operate in the time domain, having the time signal TS as its input.

In an embodiment of the invention the control device 16 comprises a spectral analyzer 19 configured to estimate a spectral representation SR of the linear predictive coding coefficients LC, a minimum-maximum analyzer 20 configured to estimate a minimum MI of the spectral representation SR and a maximum MA of the spectral representation SR below a further reference spectral line and a de-emphasis factor calculator 21, 22 configured to calculate spectral line de-emphasis factors SDF for calculating the spectral lines SLD of the reverse processed spectrum RS representing a lower frequency than the reference spectral line RSLD based on the minimum MI and on the maximum MA, wherein the spectral lines SLD of the reverse processed spectrum RS are de-emphasized by applying the spectral line de-emphasis factors SDF to spectral lines of the de-quantized spectrum DQ. The spectral analyzer may be a time-frequency converter as described above The spectral representation is the transfer function of the linear predictive coding filter. The spectral representation may be computed from an odd discrete Fourier transform (ODFT) of the linear predictive coding coefficients. In xHE-AAC and LD-USAC, the transfer function may be approximated by 32 or 64 MDCT-domain gains that cover the entire spectral representation.

In an embodiment of the invention the de-emphasis factor calculator is configured in such way that the spectral line de-emphasis factors decrease in a direction from the reference spectral line to the spectral line representing the lowest frequency of the reverse process spectrum. This means that the spectral line representing the lowest frequency is attenuated the most whereas the spectral line adjacent to the reference spectral line is attenuated the least. The reference spectral line and spectral lines representing higher frequencies than the reference spectral line are not de-emphasized at all. This reduces the computational complexity without any audible disadvantages.

In an embodiment of the invention the de-emphasis factor calculator 21, 22 comprises a first stage 21 configured to calculate a basis de-emphasis factor BDF according to a first formula $\delta=(\alpha\cdot\min/\max)^{-\beta}$, wherein $\alpha$ is a first preset value, with $\alpha>1$, $\beta$ is a second preset value, with $0<\beta\leq 1$, min is the minimum MI of the of the spectral representation SR, max is the maximum MA of the spectral representation SR and $\delta$ is the basis de-emphasis factor BDF, and wherein the de-emphasis factor calculator 21, 22 comprises a second stage 22 configured to calculate spectral line de-emphasis factors SDF according to a second formula $\zeta_i=\delta^{i'-i}$, wherein i' is a number of the spectral lines SLD to be de-emphasized, i is an index of the respective spectral line SLD, the index increases with the frequencies of the spectral lines SLD, with i=0 to i'−1, $\delta$ is the basis de-emphasis factor and $\zeta_i$ is the spectral line de-emphasis factor SDF with index i. The operation of the de-emphasis factor calculator 21, 22 is inverse to the operation of the emphasis factor calculator 10, 11 as described above. The basis de-emphasis factor BDF is calculated from a ratio in the minimum MI and the maximum MA by the first formula in an easy way. The basis de-emphasis factor BDF serves as a basis for the calculation of all spectral line de-emphasis factors SDF, wherein the second formula ensures that the spectral line de-emphasis factors SDF decrease in a direction from the reference spectral line RSLD to the spectral line $SL_0$ representing the lowest frequency of the reverse processed spectrum RS. In contrast to known technology solutions the proposed solution does not necessitate a per-spectral-band square-root or similar complex operation. Only 2 division and 2 power operators are needed, one of each on encoder and decoder side.

In an embodiment of the invention the first preset value is smaller than 42 and larger than 22, in particular smaller than 38 and larger than 26, more particular smaller 34 and larger than 30. The aforementioned intervals are based on empirical experiments. Best results may be achieved when the first preset value is set to 32. Note, that the first preset value of the decoder 12 should be the same as the first preset value of the encoder 1.

In an embodiment of the invention the second preset value is determined according to the formula $\beta=1/(\theta\cdot i')$, wherein i' is the number of the spectral lines being de-emphasized, $\theta$ is a factor between 3 and 5, in particular between 3.4 and 4.6, more particular between 3.8 and 4.2. Best results may be achieved when the second preset value is set to 4. Note, that the second preset value of the decoder 12 should be the same as the second preset value of the encoder 1.

In an embodiment of the invention the reference spectral line represents RSLD a frequency between 600 Hz and 1000 Hz, in particular between 700 Hz and 900 Hz, more particular between 750 Hz and 850 Hz. These empirically found intervals ensure sufficient low-frequency emphasis as well as a low computational complexity of the system. These intervals ensure in particular that in densely populated spectra, the lower-frequency lines are coded with sufficient accuracy. In an embodiment the reference spectral line RSLD represents 800 Hz, wherein 32 spectral lines SL are de-emphasized. It is obvious that the reference spectral line RSLD of decoder 12 should represent the same frequency than the reference spectral line RSL of the encoder.

The calculation of the spectral line emphasis factors SEF may be done by the following income of the program code:

```
max = tmp = lpcGains [0];
/* find minimum (tmp) and maximum (max) of LPC gains in low
frequencies */
for (i = 1; i < 9; i++)  {
  if (tmp > lpcGains [i])  {
    tmp = lpcGains [i];
  }
  if (max < lpcGains [i])  {
    max = lpcGains [i];
  }
}
tmp *= 32.0f;
if ((max < tmp) && (max > FLT_MIN))  {
  fac = tmp = (float)pow(max / tmp, 0.0078125f);
  /* gradual lowering of lowest 32 bins; DC is lowered by (max/tmp)^1/4
  */
  for (i = 31 ; i >= 0; i--)  {
    x[i] *= fac;
    fac *= tmp;
  }
}
```

In an embodiment of the invention, the further reference spectral line represents the same or a higher frequency than the reference spectral line RSLD. These features ensure that the estimation of the minimum MI and the maximum MA is done in the relevant frequency range.

Figure 5B:
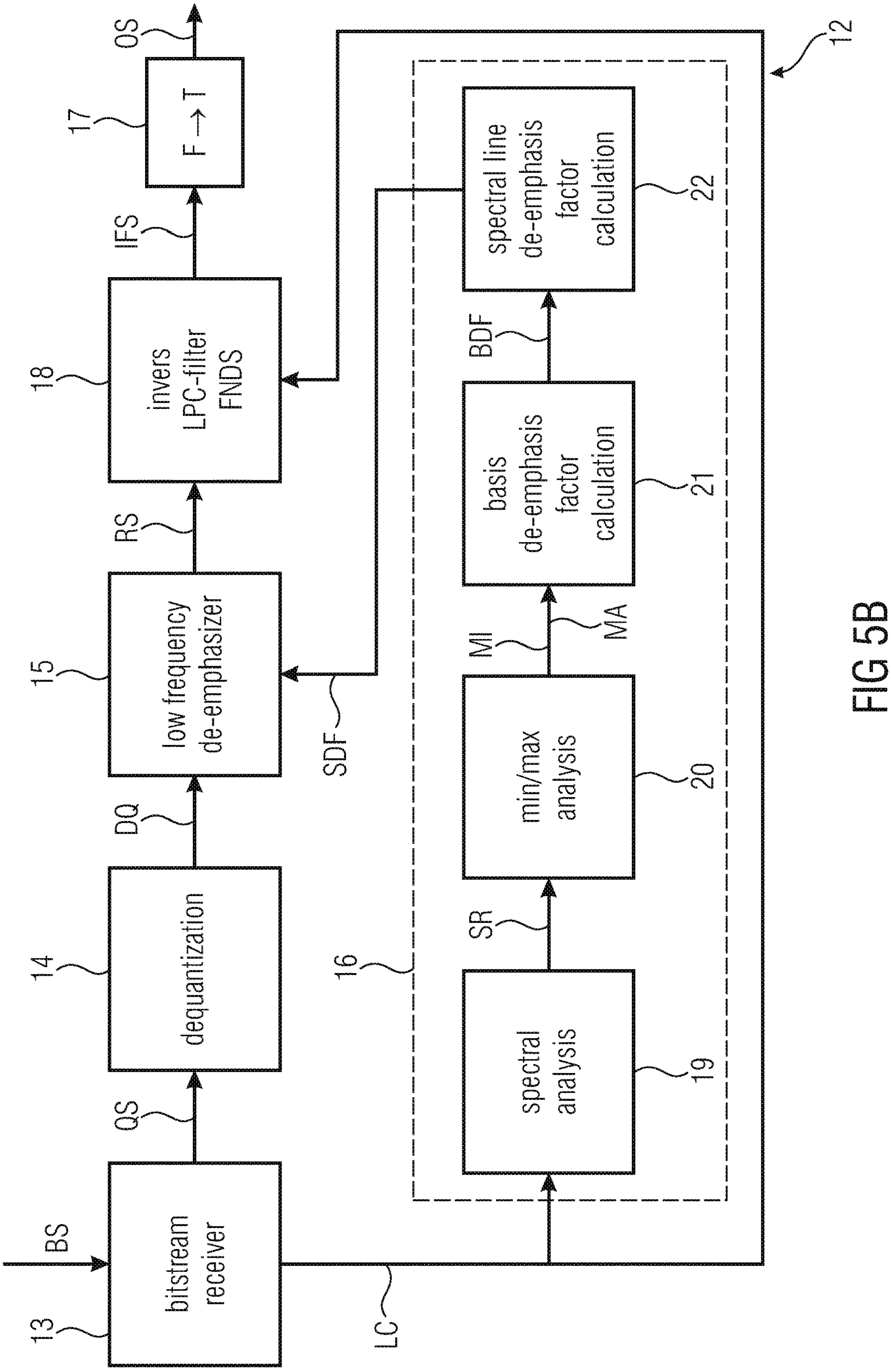
FIG. 5*b* illustrates a second embodiment of an audio decoder according to the invention.

FIG. 5*b* illustrates a second embodiment of an audio decoder 12 according to the invention. The second embodiment is based on the first embodiment. In the following only the differences between the two embodiments will be explained.

According to an embodiment of the invention the inverse linear predictive coding filter 18 is configured to estimate an inverse filtered signal IFS based on the reverse processed spectrum RS, wherein the frequency-time converter 17 is configured to output the output signal OS based on the inverse filtered signal IFS.

Alternatively and equivalently, and analogous to the above-described FDNS procedure performed on the encoder side, the order of the frequency-time 17 converter and the inverse linear predictive coding filter 18 may be reversed such that the latter is operated first and in the frequency domain (instead of the time domain). More specifically, the inverse linear predictive coding filter 18 may output an inverse filtered signal IFS based on the reverse processed spectrum RS, with the inverse linear predictive coding filter 2 applied via multiplication (or division) by a spectral representation of the linear predictive coding coefficients LC, as in [5]. Accordingly, a frequency-time converter 17 such as the above-mentioned one may be configured to estimate a frame of the output signal OS based on the inverse filtered signal IFS, which is input to the time-frequency converter 17.

It should be evident to those skilled in the art that these two approaches—a linear inverse filtering in the frequency domain followed by frequency-time conversion vs. frequency-time conversion followed by linear filtering via spectral weighting in the time domain—can be implemented such that they are equivalent.

Figure 6:
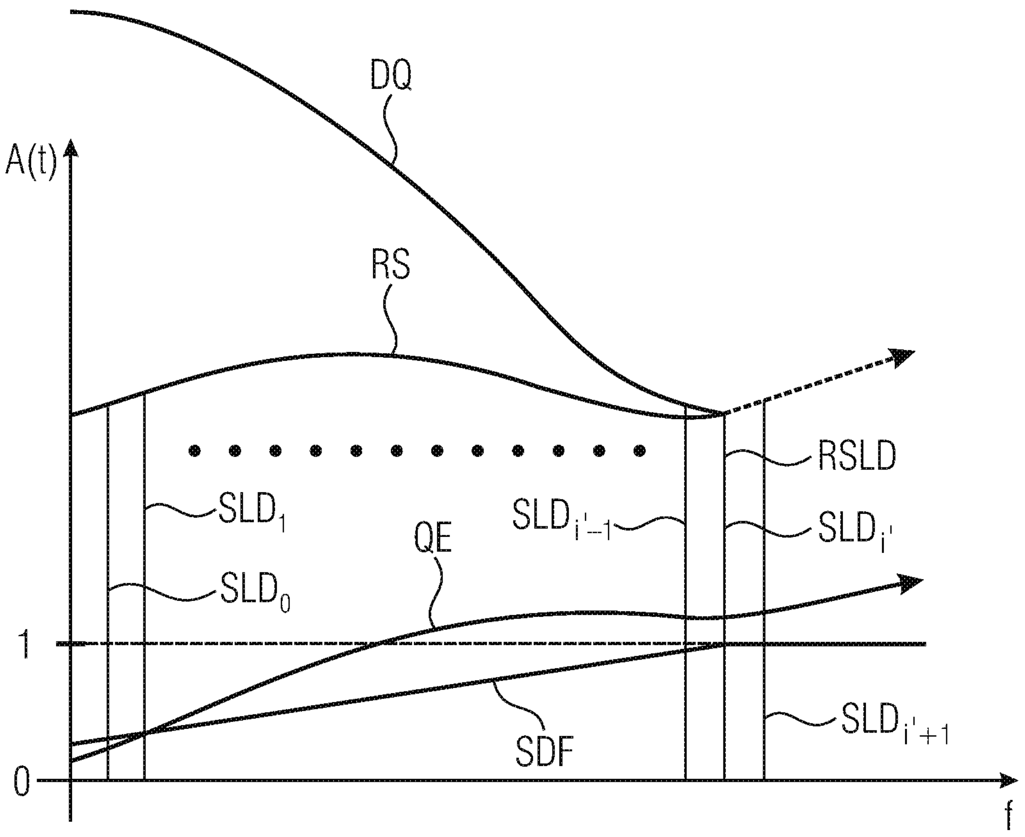
FIG. 6 illustrates a first example for low-frequency de-emphasis executed by an audio decoder according to the invention.

FIG. 6 illustrates a first example for low-frequency de-emphasis executed by a decoder according to the invention. FIG. 2 shows a de-quantized spectrum DQ, exemplary spectral line de-emphasis factors SDF and an exemplary of reverse processed spectrum RS in a common coordinate system, wherein the frequency is plotted against the x-axis and amplitude depending on the frequency is plotted against the y-axis. The spectral lines $SLD_0$ to $SLD_{i'-1}$, which represents frequencies lower than the reference spectrum line RSLD, are deemphasized, whereas the reference spectral line RSLD and the spectral line $SLD_{i'+1}$, which represents a frequency higher than the reference spectrum RSLD, are not deemphasize. FIG. 6 depicts a situation in which the ratio of the minimum MI and the maximum MA of the spectral representation SR of the linear predictive coding coefficients LC is close to 1. Therefore, a maximum spectral line emphasis factor SEF for the spectral line $SL_0$ is about 0.4. Additionally FIG. 6 shows the quantization error QE, depending on the frequency. Due to the strong low-frequency de-emphasis the quantization error QE is very low at lower frequencies.

Figure 7:
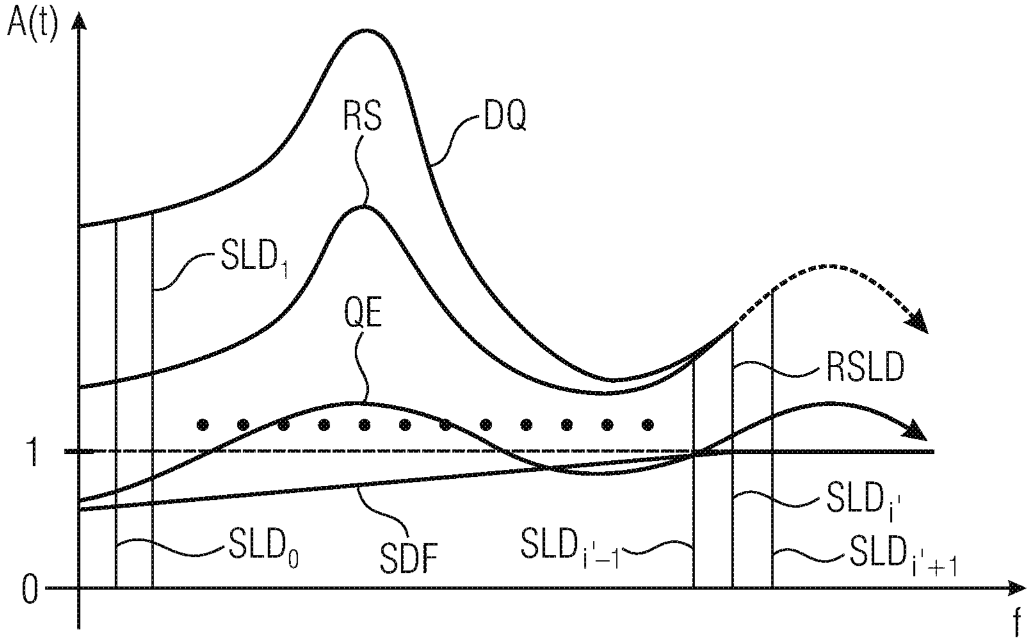
FIG. 7 illustrates a second example for low-frequency de-emphasis executed by an audio decoder according to the invention.

FIG. 7 illustrates a second example for low-frequency de-emphasis executed by a decoder according to the invention. The difference to the low-frequency emphasis as is stated in FIG. 6 is that the ratio of the minimum MI and the maximum MA of the spectral representation SR of the linear predictive coding coefficients LC is smaller. Therefore, a maximum spectral line de-emphasis factor SDF for the spectral line $SL_0$ is launcher, e.g. above 0.5. The quantization error QE is higher in this case but that is not critical as it is well below the amplitude of the reverse processed spectrum RS.

Figure 8:
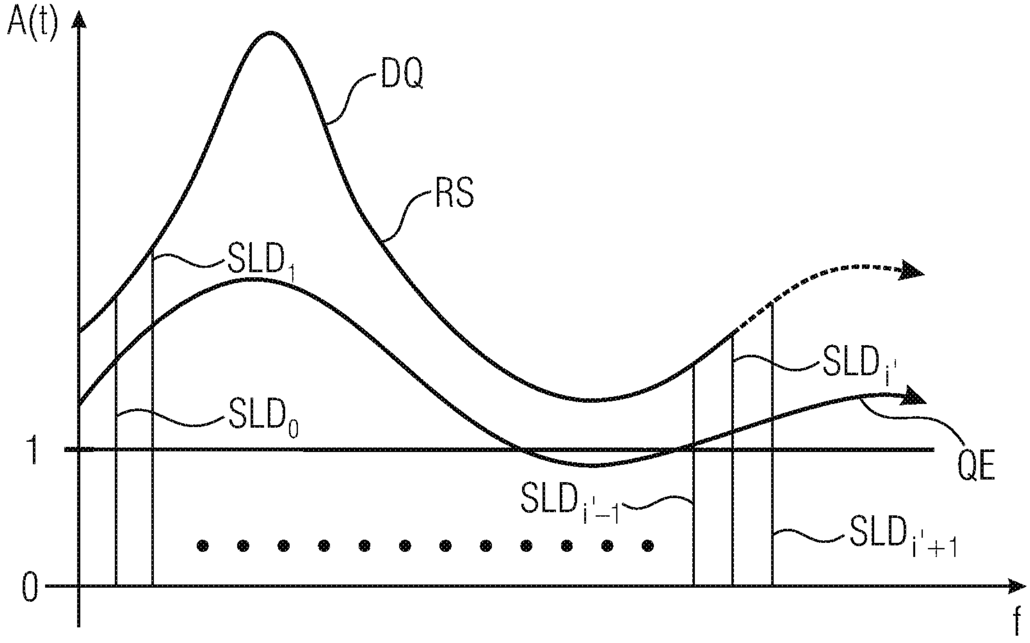
FIG. 8 illustrates a third example for low-frequency de-emphasis executed by an audio decoder according to the invention.

FIG. 8 illustrates a third example for low-frequency de-emphasis executed by a decoder according to the invention. In an embodiment of the invention the control device 16 is configured in such way that the spectral lines SLD of the reverse processed spectrum RS representing a lower frequency than the reference spectral line RSLD are de-emphasized only if the maximum MA is less than the minimum MI multiplied with the first preset value. These features ensure that low-frequency de-emphasis is only executed when needed so that the work load of the decoder 12 may be minimized. These features ensure that low-frequency de-emphasis is only executed when needed so that the work load of the encoder may be minimized. In FIG. 8 these conditions are met so that no low-frequency emphasis executed.

As a solution to the above mentioned problem of relatively high complexity (possibly causing implementation issues on low-power mobile devices) and lack of perfect invertibility (risking sufficient fidelity) of the conventional ALFE approach, a modified adaptive low-frequency emphasis (ALFE) design is proposed which

- does not necessitate a per-spectral-band square-root or similar complex operation. Only 2 division and 2 power operators are needed, one of each on encoder and decoder side.
- utilizes a spectral representation of the LPC filter coefficients as control information for the (de)emphasis, not the spectrum itself. Since identical LPC coefficients are used in encoder and decoder, the ALFE is fully invertible regardless of spectrum quantization.

The ALFE system described herein was implemented in the TCX core-coder of LD-USAC, a low-delay variant of xHE-AAC [4] which can switch between time-domain and MDCT-domain coding on a per-frame basis. The process in encoder and decoder is summarized as follows:

1. In the encoder, the minimum and maximum of the spectral representation of the LPC coefficients is found below a certain frequency. The spectral representation of a filter generally adopted in signal processing is the filter's transfer function. In xHE-AAC and LD-USAC, the transfer function is approximated by 32 or 64 MDCT-domain gains that cover the entire spectrum, computed from an odd DFT (ODFT) of the filter coefficients.
2. If the maximum is greater than a certain global minimum (e.g. 0) and less than a times larger than the minimum, with $\alpha>1$ (e.g. 32), the following 2 ALFE steps are executed.
3. A low-frequency emphasis factor $\gamma$ is computed from the ratio between minimum and maximum as $\gamma=(\alpha\leq\text{minimum}/\text{maximum})\beta$, where $0<\beta\leq1$ and $\beta$ is dependent on $\alpha$.
4. The MDCT lines with indices i lower than an index i' representing a certain frequency (i.e. all lines below that frequency, advantageously the same frequency used in step 1) are now multiplied by $\gamma_{i'-i}$. This implies that the line closest to i' is amplified the least, while the first line, the one closest to direct current, is amplified the most. Advantageously, i'=32.
5. In the decoder, steps 1 and 2 are carried out like in the encoder (same frequency limit).
6. Analogous to step 3, a low-frequency de-emphasis factor, the inverse of the emphasis factor $\gamma$, is computed as $\delta=(\alpha\leq\text{minimum}/\text{maximum})-\beta=(\text{maximum}/(\sim\cdot\text{minimum}))\beta$.
7. The MDCT lines with indices i lower than index i', with i' chosen as in the encoder, are finally multiplied by δi'−i. The result is that the line closest to i' is attenuated the least, the first line is attenuated the most, and overall the encoder-side ALFE is fully inverted.

Essentially, the proposed ALFE system ensures that in densely populated spectra, the lower-frequency lines are coded with sufficient accuracy. Three cases can serve to illustrate this, as depicted in FIG. 8. When the maximum is more than a times larger than the minimum, no ALFE is performed. This occurs when the low-frequency LPC shape contains a strong peak, probably originating from a strong isolated low-pitch tone in the input signal. LPC coders are typically able to reproduce such a signal relatively well, so an ALFE is not necessitated.

In case the LPC shape is flat, i.e. the maximum approaches the minimum, the ALFE is the strongest as depicted in FIG. 6 and can avoid coding artifacts like musical noise.

When the LPC shape is neither fully flat nor peaky, e.g. on harmonic signals with closely spaced tones, only gentle ALFE is performed as depicted in FIG. 7. It has to be noted that the application of the exponential factors $\gamma$ in step 4 and $\delta$ in step 7 does not necessitate power instructions but can be incrementally performed using only multiplications. Hence, the per-spectral-line complexity called for by the inventive ALFE scheme is very low.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

A further embodiment comprises an audio encoder for encoding a non-speech audio signal (AS) so as to produce therefrom a bitstream (BS), the audio encoder comprising: a combination of a linear predictive coding filter having a plurality of linear predictive coding coefficients (LC) and a time-frequency converter, wherein the combination is configured to filter and to convert a frame (FI) of the audio signal (AS) into a frequency domain in order to output a spectrum (SP) based on the frame (FI) and on the linear predictive coding coefficients (LC); a low frequency emphasizer configured to calculate a processed spectrum (PS) based on the spectrum (SP), wherein spectral lines (SL) of the processed spectrum (PS) representing a lower frequency than a reference spectral line (RSL) are emphasized; and a control device configured to control the calculation of the processed spectrum (PS) by the low frequency emphasizer depending on the linear predictive coding coefficients (LC) of the linear predictive coding filter.

A further embodiment comprises the audio encoder according of the immediately preceding embodiment, wherein the frame (FI) of the audio signal (AS) is input to the linear predictive coding filter, wherein a filtered frame (FF) is output by the linear predictive coding filter and wherein the time-frequency converter is configured to estimate the spectrum (SP) based on the filtered frame (FF).

A further embodiment comprises the audio encoder according to the embodiment immediately preceding the preceding embodiment, wherein the frame (FI) of the audio signal (AS) is input to the time-frequency converter, wherein a converted frame (FC) is output by the time-frequency converter and wherein the linear predictive coding filter is configured to estimate the spectrum (SP) based on the converted frame (FC).

A further embodiment comprises the audio encoder according to any of the three immediately preceding embodiments, wherein the audio encoder comprises a quantization device configured to produce a quantized spectrum (QS) based on the processed spectrum (PS) and a bitstream producer configured to embed the quantized spectrum (QS) and the linear predictive coding coefficients (LC) into the bitstream (BS).

A further embodiment comprises the audio encoder according to any of the four immediately preceding embodiments, wherein the control device comprises a spectral analyzer configured to estimate a spectral representation (SR) of the linear predictive coding coefficients (LC), a minimum-maximum analyzer configured to estimate a minimum (MI) of the spectral representation (SR) and a maximum (MA) of the spectral representation (SR) below a further reference spectral line and an emphasis factor calculator configured to calculate spectral line emphasis factors (SEF) for calculating the spectral lines (SL) of the processed spectrum (PS) representing a lower frequency than the reference spectral line (RSL) based on the minimum (MI) and on the maximum (MA), wherein the spectral lines (SL) of the processed spectrum (PS) are emphasized by applying the spectral line emphasis factors (SEF) to spectral lines of the spectrum of the filtered frame.

A further embodiment comprises the audio encoder according to any of the five immediately preceding embodiments, wherein the emphasis factor calculator is configured in such way that the spectral line emphasis factors (SEF) increase in a direction from the reference spectral line (RSL) to the spectral line (SL) representing the lowest frequency of the spectrum (SP).

A further embodiment comprises the audio encoder according to any of the two immediately preceding embodiments, wherein the emphasis factor calculator comprises a first stage configured to calculate a basis emphasis factor (BEF) according to a first formula γ=(a■min/max)13, wherein a is a first preset value, with $a>1$, β is a second preset value, with $0<\beta<1$, min is the minimum (MI) of the of the spectral representation (SR), max is the maximum (MA) of the spectral representation (SR) and Y is the basis emphasis factor (BEF), and wherein the emphasis factor calculator comprises a second stage configured to calculate spectral line emphasis factors (SEF) according to a second formula £i=γ"", wherein i' is a number of the spectral lines (SL) to be emphasized, i is an index of the respective spectral line (SL), the index increases with the frequencies of the spectral lines, with $i=0$ to $i'-1$, γ is the basis emphasis factor (BEF) and ε, is the spectral line emphasis factor (SEF) with index i.

A further embodiment comprises the audio encoder according to the three immediately preceding embodiment, wherein the first preset value is smaller than 42 and larger than 22, in particular smaller than 38 and larger than 26, more particular smaller 34 and larger than 30.

A further embodiment comprises the audio encoder according to any of the two immediately preceding embodiments, wherein the second preset value is determined according to the formula β=1/(Θ■Γ), wherein i' is the number of the spectral lines being emphasized, Θ is a factor between 3 and 5, in particular between 3.4 and 4.6, more particular between 3.8 and 4.2.

A further embodiment comprises the audio encoder according to any of the nine immediately preceding embodiments, wherein the reference spectral line (RSL) represents a frequency between 600 Hz and 1000 Hz, in particular between 700 Hz and 900 Hz, more particular between 750 Hz and 850 Hz.

A further embodiment comprises the audio encoder according to any of the six immediately preceding embodiments, wherein the further reference spectral line represents the same or a higher frequency than the reference spectral line (RSL).

A further embodiment comprises the audio encoder according to any of the eleven immediately preceding embodiments, wherein the control device (5) is configured in such way that the spectral lines (SL) of the processed spectrum (PS) representing a lower frequency than the reference spectral line (RSL) are emphasized only if the maximum (MA) is less than the minimum (MI) multiplied with the first preset value.

A further embodiment comprises an audio decoder for decoding a bitstream (BS) based on a non-speech audio signal (AS) so as to produce from the bitstream (BS) a non-speech audio output signal (OS), in particular for decoding a bitstream (BS) produced by an audio encoder any of the twelve immediately preceding embodiments, the bitstream (BS) containing quantized spectrums (QS) and a plurality of linear predictive coding coefficients (LC), the audio decoder comprising: a bitstream receiver configured to extract the quantized spectrum (QS) and the linear predictive coding coefficients (LC) from the bitstream (BS); a de-quantization device configured to produce a de-quantized spectrum (DQ) based on the quantized spectrum (QS); a low frequency de-emphasizer configured to calculate a reverse processed spectrum (RS) based on the de-quantized spectrum (DQ), wherein spectral lines (SLD) of the reverse processed spectrum (RS) representing a lower frequency than a reference spectral line (RSLD) are deemphasized; and a control device configured to control the calculation of the reverse processed spectrum (RS) by the low frequency de-emphasizer depending on the linear predictive coding coefficients (LC) contained in the bitstream (BS).

A further embodiment comprises an audio decoder according to the immediately preceding embodiment, wherein the audio decoder comprises combination of a frequency-time converter and an inverse linear predictive coding filter receiving the plurality of linear predictive coding coefficients (LC) contained in the bitstream (BS), wherein the combination is configured to inverse-filter and to convert the reverse processed spectrum (RS) into a time domain in order to output the output signal (OS) based on the reverse processed spectrum (RS) and on the linear predictive coding coefficients (LC).

A further embodiment comprises an audio decoder according to the immediately preceding embodiment, wherein the frequency-time converter is configured to estimate a time signal (TS) based on the reverse processed spectrum (RS) and wherein the inverse linear predictive coding filter is configured to output the output signal (OS) based on the time signal (TS).

A further embodiment comprises an audio decoder according to the embodiment preceding the immediately preceding embodiment, wherein the inverse linear predictive coding filter is configured to estimate an inverse filtered signal (IFS) based on the reverse processed spectrum (RS) and wherein the frequency-time converter is configured to output the output signal (OS) based on the inverse filtered signal (IFS).

A further embodiment comprises an audio decoder according to any of the four immediately preceding embodiments, wherein the control device comprises a spectral analyzer configured to estimate a spectral representation (SR) of the linear predictive coding coefficients (LC), a minimum-maximum analyzer configured to estimate a minimum (MI) of the spectral representation (SR) and a maximum (MA) of the spectral representation (SR) below a further reference spectral line and a de-emphasis factor calculator configured to calculate spectral line de-emphasis factors (SDF) for calculating the spectral lines (SLD) of the reverse processed spectrum (RS) representing a lower frequency than the reference spectral line (RSLD) based on the minimum (MI) and on the maximum (MA), wherein the spectral lines (SLD) of the reverse processed spectrum (RS) are de-emphasized by applying the spectral line de-emphasis factors (SDF) to spectral lines of the spectrum of the de-quantized spectrum (DQ).

A further embodiment comprises an audio decoder according to the immediately preceding embodiment, wherein the de-emphasis factor calculator is configured in such way that the spectral line de-emphasis factors (SDF) decrease in a direction from the reference spectral line (RSLD) to the spectral line (SL) representing the lowest frequency of the reverse process spectrum (RS).

A further embodiment comprises an audio decoder according to any of the two immediately preceding embodiments, wherein the de-emphasis factor calculator comprises a first stage configured to calculate a basis de-emphasis factor (BDF) according to a first formula δ=(a■min/max) "13, wherein a is a first preset value, with a>1, β is a second preset value, with 0<β<1, min is the minimum (MI) of the of the spectral representation (SR), max is the maximum (MA) of the spectral representation (SR) and δ is the basis de-emphasis factor (BDF), and wherein the de-emphasis factor calculator comprises a second stage configured to calculate spectral line de-emphasis factors (SDF) according to a second formula ζ, =δ' wherein i' is a number of the spectral lines (SLD) to be de-emphasized, i is an index of the respective spectral line (SLD), the index increases with the frequencies of the spectral lines, with i=0 to i'−1, δ is the basis de-emphasis factor (BDF) and ζ is the spectral line de-emphasis factor (SDF) with index i.

A further embodiment comprises an audio decoder according to the immediately preceding embodiment, wherein the first preset value is smaller than 42 and larger than 22, in particular smaller than 38 and larger than 26, more particular smaller 34 and larger than 30.

A further embodiment comprises an audio decoder according to any of the two immediately preceding embodiments, wherein the second preset value is determined according to the formula β=1/(θ·i'), wherein i' is the number of the spectral lines (SLD) being de-emphasized, Θ is a factor between 3 and 5, in particular between 3.4 and 4.6, more particular between 3.8 and 4.2.

A further embodiment comprises an audio decoder according to any of the nine immediately preceding embodiments, wherein the reference spectral line (RSLD) represents a frequency between 600 Hz and 1000 Hz, in particular between 700 Hz and 900 Hz, more particular between 750 Hz and 850 Hz.

A further embodiment comprises an audio decoder according to any of the six immediately preceding embodiments, wherein the further reference spectral line represents the same or a higher frequency than the reference spectral line (RSLD).

A further embodiment comprises an audio decoder according to any of the eleven immediately preceding embodiments, wherein the control device is configured in such way that the spectral lines (SLD) of the reverse processed spectrum (RS) representing a lower frequency than the reference spectral line (RSLD) are de-emphasized only if the maximum (MA) is less than the minimum (MI) multiplied with the first preset value.

A further embodiment comprises a system comprising a decoder and an encoder, wherein the encoder is designed according to one of the twelve embodiments immediately preceding the twelve immediately preceding embodiments and/or the decoder is designed according to one of the twelve immediately preceding embodiments.

A further embodiment comprises a method for encoding a non-speech audio signal (AS) so as to produce therefrom a bitstream (BS), the method comprising the steps: filtering with a linear predictive coding filter having a plurality of linear predictive coding coefficients (LC) and converting a frame (FI) of the audio signal (AS) into a frequency domain in order to output a spectrum (SP) based on the frame (FI) and on the linear predictive coding coefficients (LC); calculating a processed spectrum (PS) based on the spectrum (SP), wherein spectral lines (SL) of the processed spectrum (PS) representing a lower frequency than a reference spectral line (RSL) are emphasized; and controlling the calculation of the processed spectrum (PS) depending on the linear predictive coding coefficients (LC) of the linear predictive coding filter.

A further embodiment comprises a method for decoding a bitstream (BS) based on a non-speech audio signal (AS) so as to produce from the bitstream (BS) a non-speech audio output signal (OS), in particular for decoding a bitstream (BS) produced by the method according to the immediately preceding embodiment, the bitstream (BS) containing quantized spectrums (QS) and a plurality of linear predictive coding coefficients (LC), the method comprising the steps: extracting the quantized spectrum (QS) and the linear predictive coding coefficients (LC) from the bitstream (BS); producing a de-quantized spectrum (DQ) based on the quantized spectrum (QS); calculating a reverse processed spectrum (RS) based on the de-quantized spectrum (DQ), wherein spectral lines (SLD) of the reverse processed spectrum (RS) representing a lower frequency than a reference spectral line (RSLD) are deem phasized; and controlling the calculation of the reverse processed spectrum (RS) depending on the linear predictive coding coefficients (LC) contained in the bitstream (BS).

A further embodiment comprises a computer program for performing, when running on a computer or a processor, the method of either of the two immediately preceding embodiments.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] 3GPP TS 26.290, "Extended AMR Wideband Codec—Transcoding Functions," December 2004.

[2] B. Bessette, U.S. Pat. No. 7,933,769 B2, "Methods and devices for low-frequency emphasis during audio compression based on ACELP/TCX", April 2011.

[3] J. Makinen et al., "AMR-WB+: A New Audio Coding Standard for 3rd Generation Mobile Audio Services," in Proc. ICASSP 2005, Philadelphia, USA, March 2005.

[4] M. Neuendorf et al., "MPEG Unified Speech and Audio Coding—The ISO/MPEG Standard for High-Efficiency Audio Coding of All Content Types," in Proc. 132nd Convention of the AES, Budapest, Hungary, April 2012. Also to appear in the Journal of the AES, 2013.

[5] T. Baeckstroem et al., European Patent EP 2 471 061 B1, "Multi-mode audio signal decoder, multi-mode audio signal encoder, methods and computer program using linear prediction coding based noise shaping".

The invention claimed is:

1. Audio encoder for encoding a non-speech audio signal so as to produce therefrom a bitstream, the audio encoder comprising:

a combination of a linear predictive coding filter comprising a plurality of linear predictive coding coefficients and a time-frequency converter, wherein the combination is configured to filter and to convert a frame of the audio signal into a frequency domain in order to output a spectrum based on the frame and on the linear predictive coding coefficients;

a low frequency emphasizer configured to calculate a processed spectrum based on the spectrum, wherein spectral lines of the processed spectrum representing frequencies lower than a reference spectral line are emphasized;

a control device configured to control the calculation of the processed spectrum by the low frequency emphasizer depending on the linear predictive coding coefficients of the linear predictive coding filter; and a quantization device configured to produce a quantized spectrum based on the processed spectrum.

2. Audio encoder according to claim 1, wherein the frame of the audio signal is input to the linear predictive coding filter, wherein a filtered frame is output by the linear predictive coding filter and wherein the time-frequency converter is configured to estimate the spectrum based on the filtered frame.

3. Audio encoder according to claim 1, wherein the frame of the audio signal is input to the time-frequency converter, wherein a converted frame is output by the time-frequency converter and wherein the linear predictive coding filter is configured to estimate the spectrum based on the converted frame.

4. Audio encoder according to claim 2, wherein the control device comprises a spectral analyzer configured to estimate a spectral representation of the linear predictive coding coefficients, a minimum-maximum analyzer configured to estimate a minimum of the spectral representation and a maximum of the spectral representation below a further reference spectral line and an emphasis factor calculator configured to calculate spectral line emphasis factors for calculating the spectral lines of the processed spectrum representing frequencies lower than the reference spectral line based on the minimum and on the maximum, wherein the spectral lines of the processed spectrum are emphasized by applying the spectral line emphasis factors to spectral lines of a spectrum of the filtered frame.

5. Audio encoder according to claim 4, wherein the emphasis factor calculator is configured in such a way that the spectral line emphasis factors increase in a direction from the reference spectral line to a spectral line representing a lowest frequency of the processed spectrum.

6. Audio encoder according to claim 4, wherein the emphasis factor calculator comprises a first stage configured to calculate a basis emphasis factor according to a first formula $\gamma=(\alpha\cdot\min/\max)^{\beta}$, wherein $\alpha$ is a first preset value, with $\alpha>1$, $\beta$ is a second preset value, with $0<\beta\leq 1$, min is the minimum of the spectral representation, max is the maximum of the spectral representation and $\gamma$ is the basis emphasis factor, and wherein the emphasis factor calculator comprises a second stage configured to calculate spectral line emphasis factors according to a second formula $\varepsilon_i=\gamma^{i'-i}$, wherein i' is a number of the spectral lines of the processed spectrum representing frequencies lower than the reference spectral line, i is an index of one of the spectral lines of the processed spectrum representing frequencies lower than the reference spectral line, the index increases with the frequencies of the spectral lines of the processed spectrum representing frequencies lower than the reference spectral line, with i=0 to i'−1, $\gamma$ is the basis emphasis factor and $\varepsilon_i$ is a spectral line emphasis factor with index i.

7. Audio encoder according to claim 6, wherein the first preset value is smaller than 42 and larger than 22.

8. Audio encoder according to claim 6, wherein the second preset value is determined according to the formula $\beta=1/(\theta\cdot i')$, wherein i' is the number of the spectral lines of the processed spectrum representing frequencies lower than the reference spectral line, $\theta$ is a factor between 3 and 5.

9. Audio encoder according to claim 1, wherein the reference spectral line represents a frequency between 600 Hz and 1000 Hz.

10. Audio encoder according to claim 4, wherein the further reference spectral line represents a frequency which is the same as or higher than a frequency represented by the reference spectral line.

11. Audio encoder according to claim 1, wherein the control device is configured in such a way that the spectral lines of the processed spectrum representing frequencies lower than the reference spectral line are emphasized only if a maximum is less than a minimum multiplied with a first preset value.

12. Audio decoder for decoding a bitstream based on a non-speech audio signal so as to produce from the bitstream a non-speech audio output signal, the bitstream comprising quantized spectrums and a plurality of linear predictive coding coefficients, the audio decoder comprising:

a de-quantization device configured to produce a de-quantized spectrum based on one of the quantized spectrums;

a low frequency de-emphasizer configured to calculate a reverse processed spectrum based on the de-quantized spectrum, wherein spectral lines of the reverse processed spectrum representing frequencies lower than a reference spectral line are deemphasized; and a control device configured to control the calculation of the reverse processed spectrum by the low frequency de-emphasizer depending on the linear predictive coding coefficients comprised in the bitstream.

13. Audio decoder according to claim 12, wherein the audio decoder comprises a combination of a frequency-time converter and an inverse linear predictive coding filter receiving the plurality of linear predictive coding coefficients comprised in the bitstream, wherein the combination is configured to inverse-filter and to convert the reverse processed spectrum into a time domain in order to output the output signal based on the reverse processed spectrum and on the linear predictive coding coefficients.

14. Audio decoder according to claim 13, wherein the frequency-time converter is configured to estimate a time signal based on the reverse processed spectrum and wherein the inverse linear predictive coding filter is configured to output the output signal based on the time signal.

15. Audio decoder according to claim 13, wherein the inverse linear predictive coding filter is configured to estimate an inverse filtered signal based on the reverse processed spectrum and wherein the frequency-time converter is configured to output the output signal based on the inverse filtered signal.

16. Audio decoder according to claim 12, wherein the control device comprises a spectral analyzer configured to estimate a spectral representation of the linear predictive coding coefficients, a minimum-maximum analyzer configured to estimate a minimum of the spectral representation and a maximum of the spectral representation below a further reference spectral line and a de-emphasis factor calculator configured to calculate spectral line de-emphasis factors for calculating the spectral lines of the reverse processed spectrum representing frequencies lower than the reference spectral line based on the minimum and on the maximum, wherein the spectral lines of the reverse processed spectrum are de-emphasized by applying the spectral line de-emphasis factors to spectral lines of the spectrum of the de-quantized spectrum.

17. Audio decoder according to claim 16, wherein the de-emphasis factor calculator is configured in such a way that the spectral line de-emphasis factors decrease in a direction from the reference spectral line to a spectral line representing the lowest frequency of the reverse processed spectrum.

18. Audio decoder according to claim 16, wherein the de-emphasis factor calculator comprises a first stage configured to calculate a basis de-emphasis factor according to a first formula $\delta=(\alpha\cdot\min/\max)^{-\beta}$, wherein $\alpha$ is a first preset value, with $\alpha>1$, $\beta$ is a second preset value, with $0<\beta\leq 1$, min is the minimum of the spectral representation, max is the maximum of the spectral representation and $\delta$ is the basis de-emphasis factor, and wherein the de-emphasis factor calculator comprises a second stage configured to calculate spectral line de-emphasis factors according to a second formula $\zeta_i=\delta^{i'-i}$, wherein i' is a number of the spectral lines of the reverse processed spectrum representing frequencies lower than the reference spectral line, i is an index of one of the spectral lines of the reverse processed spectrum representing frequencies lower than the reference spectral line, the index increases with the frequencies of the spectral lines of the reverse processed spectrum representing frequencies lower than the reference spectral line, with i=0 to i'−1, $\delta$ is the basis de-emphasis factor and $\zeta_i$ is a spectral line de-emphasis factor with index i.

19. Audio decoder according to claim 18, wherein the first preset value is smaller than 42 and larger than 22.

20. Audio decoder according to claim 18, wherein the second preset value is determined according to the formula $\beta=1/(\theta\cdot i')$, wherein i' is the number of the spectral lines of the reverse processed spectrum representing frequencies lower than the reference spectral line, $\theta$ is a factor between 3 and 5.

21. Audio decoder according to claim 12, wherein the reference spectral line represents a frequency between 600 Hz and 1000 Hz.

22. Audio decoder according to claim 16, wherein the further reference spectral line represents a frequency which is the same as or higher than a frequency represented by the reference spectral line.

23. Audio decoder according to claim 12, wherein the control device is configured in such a way that the spectral lines of the reverse processed spectrum representing frequencies lower than the reference spectral line are de-emphasized only if a maximum is less than a minimum multiplied with a first preset value.

24. A system comprising a decoder and an encoder, wherein the encoder is designed according to claim 1 and/or the decoder is designed according to claim 12.

25. A method for encoding a non-speech audio signal so as to produce therefrom a bitstream, the method comprising:

filtering with a linear predictive coding filter comprising a plurality of linear predictive coding coefficients and converting a frame of the audio signal into a frequency domain in order to output a spectrum based on the frame and on the linear predictive coding coefficients;

calculating a processed spectrum based on the spectrum, wherein spectral lines of the processed spectrum representing frequencies lower than a reference spectral line are emphasized; and controlling the calculation of the processed spectrum depending on the linear predictive coding coefficients of the linear predictive coding filter; and producing a quantized spectrum based on the processed spectrum.

26. A method for decoding a bitstream based on a non-speech audio signal so as to produce from the bitstream a non-speech audio output signal, the bitstream comprising quantized spectrums and a plurality of linear predictive coding coefficients, the method comprising:

producing a de-quantized spectrum based on one of the quantized spectrums;

calculating a reverse processed spectrum based on the de-quantized spectrum, wherein spectral lines of the reverse processed spectrum representing frequencies lower than a reference spectral line are deemphasized; and controlling the calculation of the reverse processed spectrum depending on the linear predictive coding coefficients comprised in the bitstream.

27. A non-transitory digital storage medium having stored thereon a computer program for performing, when running on a computer or a processor, the method of claim 25.

28. A non-transitory digital storage medium having stored thereon a computer program for performing, when running on a computer or a processor, the method of claim 26.

* * * * *